United States Patent [19]

Falla et al.

[11] Patent Number: 5,508,051

[45] Date of Patent: * Apr. 16, 1996

[54] PROCESS OF PREPARING A POUCH FOR PACKAGING FLOWABLE MATERIALS

[75] Inventors: Daniel J. Falla; Michael C. Restaino, both of Sarnia, Canada

[73] Assignee: The Dow Chemical Company, Midland, Mich.

[*] Notice: The portion of the term of this patent subsequent to Aug. 9, 2011, has been disclaimed.

[21] Appl. No.: 332,201

[22] Filed: Oct. 31, 1994

Related U.S. Application Data

[62] Division of Ser. No. 82,136, Jun. 24, 1993, Pat. No. 5,360,648.

[51] Int. Cl.⁶ ............................................. B65D 85/80
[52] U.S. Cl. ................ 426/392; 426/127; 426/130; 426/106; 428/34.9; 428/35.2; 428/500; 428/515; 428/518; 383/109; 383/113
[58] Field of Search ......................... 426/115, 106, 426/127, 130, 392, 410, 413, 415; 428/34.9, 35.1, 35.2, 35.7, 213, 500, 515, 518; 383/109, 113; 525/240; 526/348.5; 220/569, 415, DIG. 11; 206/524.3

[56] References Cited

U.S. PATENT DOCUMENTS

| | | | |
|---|---|---|---|
| 3,250,825 | 5/1966 | Martinovich | 260/897 |
| 3,645,992 | 2/1972 | Elston | 260/80.78 |
| 3,682,767 | 8/1972 | Britton et al. | 161/227 |
| 3,741,253 | 6/1973 | Brox et al. | 138/137 |
| 3,900,635 | 8/1975 | Funderburk, Jr. et al. | 428/516 X |
| 4,071,674 | 1/1978 | Kashiwa et al. | 526/125 |
| 4,076,698 | 2/1978 | Anderson et al. | 526/348.6 |
| 4,123,576 | 10/1978 | Kobayashi et al. | 428/516 X |
| 4,151,318 | 4/1979 | Marshall | 428/35.2 X |
| 4,205,021 | 5/1980 | Morita et al. | 526/348.6 X |
| 4,243,619 | 1/1981 | Fraser et al. | 264/40.6 |
| 4,265,949 | 5/1981 | Kugimiya | 428/35.2 X |
| 4,294,947 | 10/1981 | Doerk et al. | 526/348.6 X |
| 4,302,565 | 11/1981 | Goeke et al. | 526/348.6 X |
| 4,302,566 | 11/1981 | Karol et al. | 526/348.6 X |
| 4,303,710 | 12/1981 | Bullard et al. | 428/35.2 X |
| 4,311,752 | 1/1982 | Diedrich et al. | 526/348.6 X |
| 4,328,328 | 5/1982 | Minami et al. | 526/348.6 X |
| 4,333,299 | 6/1982 | Hamilton | 53/450 |
| 4,346,834 | 8/1982 | Mazumdar | 428/516 X |
| 4,356,221 | 10/1982 | Anthony et al. | 428/516 X |
| 4,357,191 | 11/1982 | Bullard et al. | 428/516 X |
| 4,367,841 | 1/1983 | Mazumdar | 428/35.2 X |
| 4,390,573 | 6/1983 | Bullard et al. | 428/35.2 X |

(List continued on next page.)

FOREIGN PATENT DOCUMENTS

| | | |
|---|---|---|
| 1205052 | 5/1986 | Canada . |
| 0002606 | 6/1979 | European Pat. Off. . |
| 54-152086 | 11/1979 | Japan . |
| 4152086 | 11/1979 | Japan . |
| 7193353 | 11/1982 | Japan . |
| 57-193353 | 11/1982 | Japan . |
| 58-109547 | 6/1983 | Japan . |
| 8109547 | 6/1983 | Japan . |
| 8120654 | 7/1983 | Japan . |
| 58-120654 | 7/1983 | Japan . |
| 9075933 | 4/1984 | Japan . |
| 59-075933 | 4/1984 | Japan . |
| 9302859 | 2/1993 | WIPO . |
| 9303093 | 2/1993 | WIPO . |
| 9308221 | 4/1993 | WIPO . |
| 9406859 | 3/1994 | WIPO . |

Primary Examiner—Donald E. Czaja
Assistant Examiner—Milton I. Cano

[57] ABSTRACT

An environmentally friendly polymer film pouch made from a homogeneously branched substantially linear ethylene interpolymer film structure for the packaging of flowable materials such as milk, the pouch includes, for example, a multilayer film structure such as a two-layer or a three-layer coextruded film containing at least one seal layer of a homogeneously branched substantially linear polyethylene. A process for making a pouch for packaging flowable materials using a homogeneously branched substantially linear ethylene interpolymer film structure is also disclosed.

17 Claims, 14 Drawing Sheets

U.S. PATENT DOCUMENTS

| | | | |
|---|---|---|---|
| 4,405,666 | 9/1983 | Squier | 428/516 X |
| 4,405,667 | 9/1983 | Christensen et al. | 428/35.2 |
| 4,418,114 | 11/1983 | Briggs et al. | 428/516 X |
| 4,429,079 | 1/1984 | Shibata et al. | 428/35.2 X |
| 4,447,480 | 5/1984 | Lustig et al. | 426/129 X |
| 4,503,102 | 3/1985 | Mollison | 428/35.4 |
| 4,505,969 | 3/1985 | Weiner | 428/35.2 X |
| 4,521,437 | 6/1985 | Storms | 426/130 |
| 4,525,257 | 6/1985 | Kurtz et al. | 525/222 X |
| 4,534,154 | 8/1985 | Gaubert | 53/458 |
| 4,547,413 | 10/1985 | Lustig et al. | 525/240 X |
| 4,565,720 | 1/1986 | Yaeo et al. | 428/35.2 X |
| 4,565,742 | 1/1986 | Long | 428/518 X |
| 4,640,856 | 2/1987 | Ferguson et al. | 428/516 X |
| 4,668,752 | 5/1987 | Tominari et al. | 526/348.5 X |
| 4,701,359 | 10/1987 | Akao | 428/35.2 |
| 4,775,562 | 10/1988 | Shishido et al. | 428/35.2 |
| 4,801,486 | 6/1989 | Quaeguarelle et al. | 428/34.9 |
| 4,820,557 | 4/1989 | Warren | 428/34.9 |
| 4,837,084 | 6/1989 | Warren | 428/349 |
| 4,863,769 | 9/1989 | Lustig et al. | 428/34.9 |
| 4,869,912 | 9/1989 | McCoy et al. | 426/106 X |
| 4,877,663 | 10/1989 | Kombe et al. | 428/35.5 |
| 4,927,708 | 5/1990 | Herron et al. | 428/332 |
| 4,963,419 | 10/1990 | Lustig et al. | 428/36.7 |
| 5,041,316 | 8/1991 | Pannell et al. | 428/35.4 |
| 5,059,481 | 10/1991 | Lustig et al. | 428/39.9 |
| 5,272,236 | 12/1993 | Lai et al. | 526/348.5 |
| 5,278,272 | 1/1994 | Lai et al. | 526/348.5 |
| 5,288,531 | 2/1994 | Falla et al. | 428/35.2 |
| 5,360,648 | 11/1994 | Falla et al. | 428/35.2 |
| 5,364,486 | 11/1994 | Falla et al. | 156/308.4 |

PROCESS OF PREPARING A POUCH FOR PACKAGING FLOWABLE MATERIALS

CROSS-REFERENCE TO RELATED APPLICATIONS

This is a divisional of application Ser. No. 08/082,136, filed Jun. 24, 1993, now U.S. Pat. No. 5,360,648.

This application is related to: application Ser. No. 07/742,800, now U.S. Pat. No. 5,288,531, filed Aug. 9, 1991; application Ser. No. 07/776,130, now U.S. Pat. No. 5,272,236, filed Oct. 15, 1991; application Ser. No. 07/939,281, now U.S. Pat. No. 5,278,272, filed Sep. 2, 1992; application Ser. No. 07/961,269 filed Oct. 14, 1992; and application Ser. No. 08/024,563, now abandoned, filed Mar. 1, 1993, and pending application Ser. No. 08/289,985, filed Aug. 12, 1994 the disclosures of each of which are incorporated herein in their entirety by reference.

FIELD OF THE INVENTION

This invention relates to a pouch used in consumer packaging useful for packaging flowable materials, (e.g., liquids such as milk). The pouch is made from certain film structures comprising at least one homogeneously branched substantially linear ethylene interpolymer.

BACKGROUND OF THE INVENTION

U.S. Pat. Nos. 4,503,102 and 4,521,437 disclose the preparation of a polyethylene film for use in the manufacture of a disposable pouch for packaging of liquids such as milk. U.S. Pat. No. 4,503,102 discloses pouches made from a blend of a linear ethylene copolymer copolymerized from ethylene and an alpha-olefin at the C4C10 range and an ethylene-vinyl acetate polymer copolymerized from ethylene and vinyl acetate. The linear polyethylene copolymer has a density of from 0.916 to 0.930 grams/cubic centimeter (g/cm$^3$) and a melt index of from 0.3 to 2.0 grams/10 minutes (g/10 min). The ethylene-vinyl acetate polymer has a weight ratio of ethylene to vinyl acetate from 2.2:1 to 24:1 and a melt index of from 0.2 to 10 g/10 min. The blend disclosed in U.S. Pat. No. 4,503,102 has a weight ratio of linear low density polyethylene to ethylene-vinyl acetate polymer of from 1.2:1 to 4:1. U.S. Pat. No. 4,503,102 also discloses laminates having as a sealant film the aforementioned blend.

U.S. Pat. No. 4,521,437 describes pouches made from a sealant film which is from 50 to 100 parts of a linear copolymer of ethylene and octene-1 having a density of from 0.916 to 0.930 g/cm$^3$ and a melt index of 0.3 to 2.0 g/10 min and from 0 to 50 parts by weight of at least one polymer selected from the group consisting of a linear copolymer of ethylene and a C$_1$–C$_{10}$ alpha-olefin having a density of from 0.916 to 0.930 g/cm$^3$ and a melt index of from 0.3 to 2.0 g/10 min, a high-pressure polyethylene having a density of from 0.916 to 0.924 g/cm$^3$ and a melt index of from 1 to 10 g/10 min and blends thereof. The sealant film disclosed in the U.S. Pat. No. 4,521,437 is selected on the basis of providing (a) pouches with an M-test value substantially smaller, at the same film thickness, than that obtained for pouches made with film of a blend of 85 parts of a linear ethylene/butene-1 copolymer having a density of about 0.919 g/cm$^3$ and a melt index of about 0.75 g/10 min and 15 parts of a high pressure polyethylene having a density of about 0.918 g/cm$^3$ and a melt index of 8.5 g/10 min, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)-tests are defined pouch drop tests in U.S. Pat. No. 4,521,437. The pouches may also be made from composite films in which the sealant film forms at least the inner layer.

The polyethylene pouches known in the prior art have some deficiencies. The problems associated with the prior art known films relate to the sealing properties and performance properties of the film for preparing pouches. In particular, prior art films made into pouches have a high incident of "leakers", i.e., seal defects such as pinholes which develop at or near the seal in which flowable material, for example milk, escapes from the pouch. Although the seal and performance properties of the prior art films have been satisfactory, there is still a need in the industry for better seal and performance properties in films for manufacture of hermetically sealed pouches containing flowable materials. More particularly, there is a need for improved sealing properties of the film such as hot tack and heat seal initiation temperature in order to improve the processability of the film and to improve pouches made from the films.

For example, the line speed of known packaging equipment used for manufacturing pouches such as form, fill and seal machines, is currently limited by the sealing properties of the film used in the machines. Prior art polyethylene films have high hot tack seal initiation temperatures and a narrow sealing range. Therefore, the rate at which a form, fill and seal machine can produce pouches is limited. If the heat seal temperature range where one could obtain strong seals is broadened, then the speed of a form, fill and seal machine can be increased and, thus, the rate at which pouches can be produced can be increased. Until the present invention, many have attempted to broaden the heat seal temperature range of pouch film without success.

It is desired to provide a polyethylene flint structure for a pouch container having a broad heat sealing range with performance properties as good or better than the known prior art pouch films.

It is also desired to provide a film structure for a pouch container having a heat seal layer such that the film structure has a broader sealing range for pouch conversion and has acceptable physical properties in the finished product.

It is further desired to provide a pouch made from the aforementioned film structures such that the pouch has a reduced failure rate.

SUMMARY OF THE INVENTION

We have now discovered that new homogeneously branched substantially linear ethylene/α-olefin interpolymers offer significant advantages in film structures of pouches. The novel homogeneously branched substantially linear ethylene/α-olefin interpolymers, when used as a seal layer, have good heat sealability at temperatures lower than those necessary for heterogeneously branched linear ethylene/α-olefin interpolymers and are also easily processed on conventional film and heat seal equipment. Pouches made from film structures comprising the homogeneously branched substantially linear ethylene/α-olefin interpolymers, when used as a seal layer or as a core layer, also have surprisingly good bursting performance.

One aspect of the present invention is directed to a pouch made from a film structure in tubular form and having transversely heat sealed ends, the film structure having at least one film layer comprising:

(I) from 10 to 100 percent by weight of at least one layer comprising at least one homogeneously branched substantially linear ethylene/α-olefin interpolymer characterized as having:
   (a) a melt flow ratio, $I_{10}/I_2$,>5.63, and
   (b) a molecular weight distribution, $M_w/M_n$, defined by the equation: $M_w/M_n<(I_{10}/I_2)-4.63$; and
(II) from 0 to 90 percent by weight of at least one polymer selected from the group consisting of a heterogeneously branched linear ethylene/$C_3$–$C_{18}$ α-olefin copolymer, a high-pressure low density polyethylene, and an ethylene-vinyl acetate copolymer.

One embodiment of the present invention is a pouch made from a two-layer (i.e., A/B) coextruded film containing an outer layer of a heterogeneously branched linear low density polyethylene and an inner seal layer of the aforementioned homogeneously branched substantially linear ethylene interpolymer.

Another embodiment of the present invention is a pouch made from a three-layer (i.e., A/B/A or A/B/C) coextruded film containing an outer layer and a core layer comprising heterogeneously branched linear low density polyethylene (either the same or different heterogeneously branched linear low density polyethylenes) or a high pressure low density polyethylene and an inner seal layer comprising the aforementioned homogeneously branched substantially linear ethylene interpolymer.

Another aspect of the present invention is a process for preparing the aforementioned pouch.

Film structures for the pouches of the present invention have a better seal at lower sealing temperatures and shorter dwell times than currently obtainable with commercially available film. Use of the films for making pouches of the present invention in form, fill and seal machines leads to machine speeds higher than currently obtainable with the use of commercially available film.

DETAILED DESCRIPTION OF THE INVENTION

Figure 1:
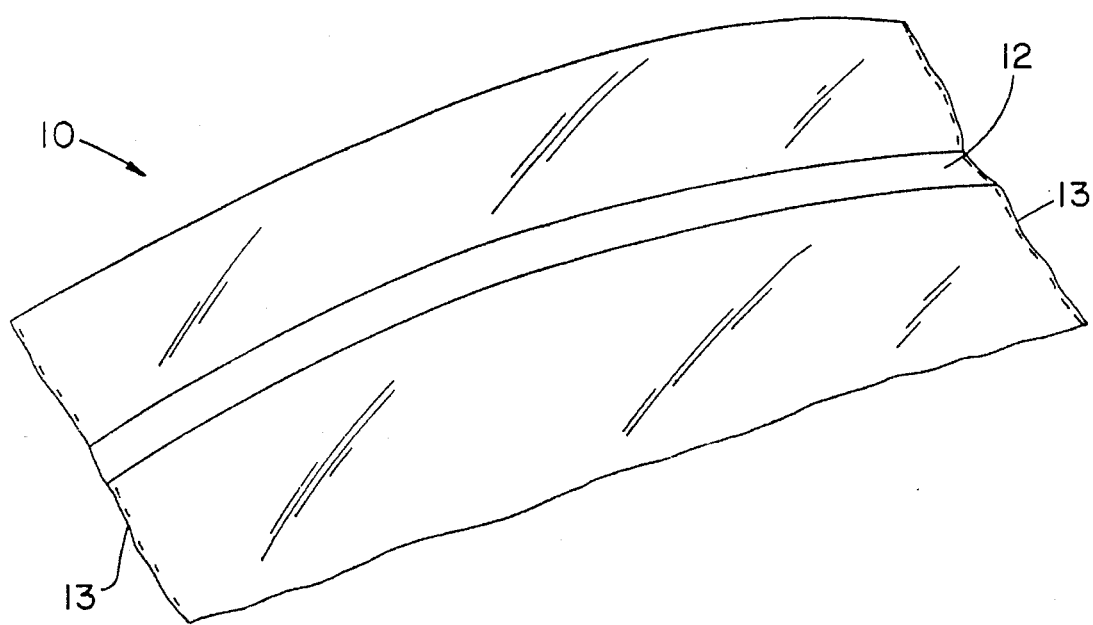
FIG. 1 shows a perspective view of a pouch package of the present invention.
Figure 2:
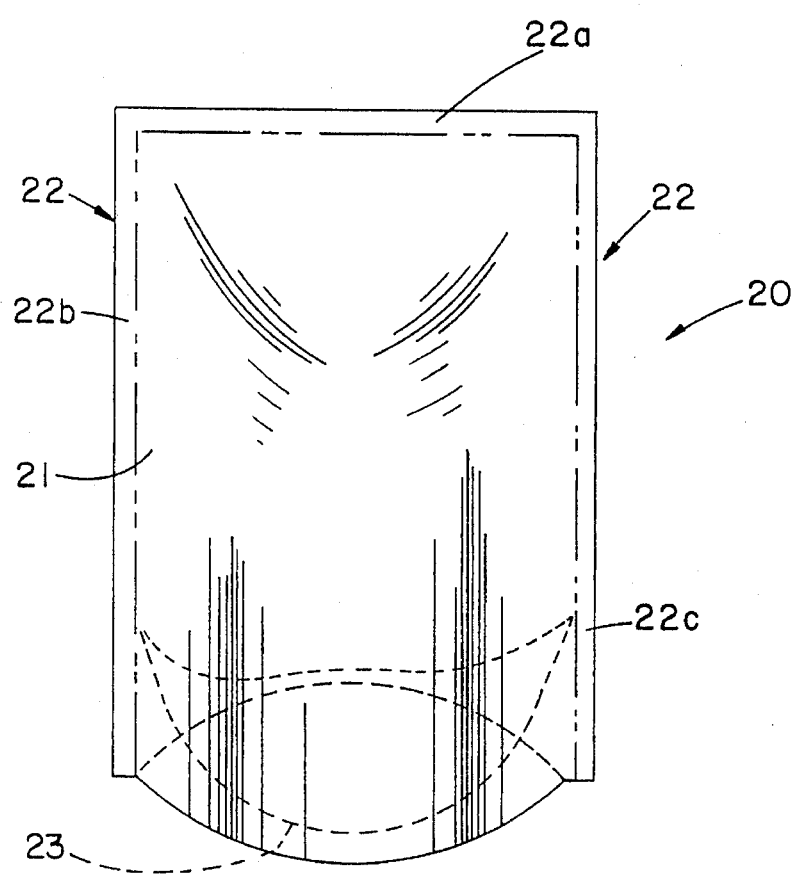
FIG. 2 shows a perspective view of another pouch package of the present invention.

The pouch of the present invention, for example as shown in FIGS. 1 and 2, for packaging flowable materials is manufactured from a monolayer film structure of a polymeric seal layer which is a homogeneously branched substantially linear ethylene/α-olefin interpolymer (referred to hereinafter as "SLEP").

The SLEP of the present invention is generally an interpolymer of ethylene with at least one α-olefin having from 3 to 20 carbon atoms. The term "interpolymer" is used herein to indicate a copolymer, or a terpolymer, or the like. That is, at least one other comonomer is polymerized with ethylene to make the interpolymer. For example, a SLEP terpolymer comprising ethylene/1-octene/1-hexene may be employed in the film structure as the polymeric seal layer.

Copolymers of ethylene and a $C_3$–$C_{20}$ α-olefin are especially preferred, for example, the SLEP may be selected from ethylene/propene, ethylene/1-butene, ethylene/1-pentene, ethylene/4-methyl-1-pentene, ethylene/1-hexene, ethylene/1-heptene, ethylene/1-octene and ethylene/1-decene copolymers, preferably ethylene/1-octene copolymer.

The term "substantially linear" means that the interpolymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least about 6 carbons, above which the length cannot be distinguished using $^{13}C$ nuclear magnetic resonance spectroscopy. The length of the long chain branch can vary, but can be about as long as the length of the polymer back-bone itself.

Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference.

The substantially linear ethylene/α-olefin copolymers and interpolymers of the present invention are herein defined as in copending application Ser. No. 07/776,130 and in copending application Ser. No. 07/939,281 filed Sep. 2, 1992. The substantially linear ethylene/α-olefin copolymers and interpolymers useful for forming the compositions described herein are homogeneously branched (i.e., the comonomer is randomly distributed within a given interpolymer molecule and wherein substantially all of the interpolymer molecules have the same ethylene/comonomer ratio within that interpolymer).

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear ethylene/α-olefin interpolymers and copolymers used in the present invention is preferably greater than about 30 percent, especially greater than about 50 percent. The substantially linear ethylene/α-olefin interpolymers and copolymers used in this invention essentially lack a measurable "high density" fraction as measured by the TREF technique. The "high density" fraction includes linear homopolymer polyethylene. The "high density" polymer fraction can be described as a polymer fraction with a degree of branching less than or equal to about 2 methyls/1000 carbons. The terms "essentially lacks a measurable high density fraction" means that the substantially linear interpolymers and copolymers do not contain a polymer fraction with a degree of branching less than or equal to about 2 methyls/1000 carbons.

The novel homogeneously branched SLEP are easily distinguished from homogeneously branched linear ethylene/α-olefin interpolymers. The term "linear ethylene/α-olefin interpolymer" means that the interpolymer does not have long chain branching. That is, the linear ethylene/α-olefin interpolymer has an absence of long chain branching, as for example the homogeneously branched linear low density polyethylene polymers made using uniform branching distribution polymerization processes (e.g., as described in U.S. Pat. No. 3,645,992 (Elston), the disclosure of which is incorporated herein by reference). For both the linear and substantially linear interpolymers, however, the term "homogeneously branched" means that the comonomer is randomly distributed within a given interpolymer molecule and wherein substantially all of the interpolymer molecules have the same ethylene/comonomer ratio within that interpolymer. The term "linear ethylene/α-olefin interpolymer" does not refer to high pressure branched (free-radical polymerized) polyethylene which is known to those skilled in the art to have numerous long chain branches.

The homogeneously branched substantially linear ethylene/α-olefin copolymers and interpolymers also have a single melting point, as opposed to traditional Ziegler polymerized (heterogeneously branched) polymers having two or more melting points, as determined using differential scanning calorimetry (DSC) over a temperature range of from −20° C. to 150° C. In addition, the novel homogeneously branched substantially linear ethylene/α-olefin copolymers and interpolymers have melting points which correlate with the density of the copolymer or interpolymer, i.e., as the density decreases, the peak melting point of the polymer decreases in a directly linear fashion. Heterogeneously branched ethylene polymers have peak melting points which do not vary substantially with the density of the polymer, primarily due to the presence of a high density polymer fraction which melts at about 122° C. (the melting point of homopolymer linear polyethylene).

The density of the homogeneously branched substantially linear ethylene/α-olefin interpolymers or copolymers (as measured in accordance with ASTM D-792) for use in the present invention is generally less than about 0.94 g/cm³ and preferably from about 0.85 g/cm³ to about 0.94 g/cm³.

Generally, the homogeneously branched substantially linear ethylene/α-olefin polymer is used alone in the seal layer of the film or film structure. However, the homogeneously branched substantially linear ethylene/α-olefin polymer can be blended with other polymers for use as the heat seal layer. Generally, the amount of the homogeneously branched substantially linear ethylene/α-olefin polymer is from about 10 percent to 100 percent, by weight of the film structure.

The molecular weight of the homogeneously branched substantially linear ethylene/α-olefin interpolymers and copolymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched substantially linear ethylene/α-olefin interpolymers and copolymers useful herein is generally about 10 grams/10 minutes (g/10 min) or less, preferably from about 0.01 g/10 min to about 10 g/10 min.

Another measurement useful in characterizing the molecular weight of the homogeneously branched substantially linear ethylene/α-olefin interpolymers and copolymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the homogeneously branched substantially linear ethylene/α-olefin interpolymers and copolymers used in this invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the homogeneously branched substantially linear ethylene/α-olefin interpolymers and copolymers is at least about 5.63, preferably at least about 7, especially at least about 8 or above. Generally, the $I_{10}/I_2$ ratio can be as high as about 30, preferably no higher than about 20.

MOLECULAR WEIGHT DISTRIBUTION

The molecular weight distribution ($M_w/M_n$) of the homogeneously branched substantially linear ethylene/α-olefin interpolymers and copolymers is analyzed by gel permeation chromatography (GPC) on a Waters 150 C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i *$, where $w_i$ and $M_i$ are the weight fraction and molecular weight, respectively, of the $i^{th}$ fraction eluting from the GPC column.

For the homogeneously branched substantially linear ethylene/α-olefin interpolymers and copolymers, the $M_w/M_n$ is preferably from about 1.5 to about 2.5, especially about 2.

Additives

Additives, known to those skilled in the art, such as antioxidants (e.g., hindered phenolics (e.g., Irganox® 1010 or Irganox® 1076 made by Ciba Geigy Corp.), phosphites (e.g., Irgafos® 168 made by Ciba Geigy Corp.)), cling additives (e.g., polyisobutylene (PIB)), Standostab PEPQ™ supplied by Sandoz, anti-block additives, slip additives, UV stabilizers, pigments, processing aids and the like can also be added to the polymers from which the pouches of the present invention are made.

Processing Index

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the homogeneously branched ethylene polymers described herein, the PI is the apparent viscosity (in kpoise) of a material measured by GER at an apparent shear stress of $2.15 \times 10^6$ dyne/cm². The novel substantially linear ethylene/α-olefin interpolymers and copolymers described herein preferably have a PI in the range of about 0.01 kpoise to about 50 kpoise, more preferably about 15 kpoise or less. The novel substantially linear ethylene/α-olefin polymers described herein for use in the pouches have a PI less than or equal to about 70% of the PI of a linear ethylene/α-olefin polymer at about the same or substantially the same $I_2$ and $M_w/M_n$ and the same comonomer(s).

An apparent shear stress vs. apparent shear rate plot is used to identify the melt fracture phenomena. According to Ramamurthy in *Journal of Rheology*, 30(2), 337–357, 1986, the disclosure of which is incorporated herein by reference, above a certain critical flow rate, the observed extrudate irregularities may be broadly classified into two main types: surface melt fracture and gross melt fracture. Surface melt fracture occurs under apparently steady flow conditions and ranges in detail from loss of specular gloss to the more severe form of "sharkskin". Gross melt fracture occurs at unsteady flow conditions and ranges in detail from regular (alternating rough and smooth, helical, etc.) to random distortions.

Ramamurthy (*Journal of Rheology*) and Moynihan, Baird and Ramanathan in *Journal of Non-Newtonian Fluid Mechanics*, 36, 255–263 (1990), the disclosure of which is also incorporated herein by reference, both disclose that the onset of sharkskin (i.e., melt fracture) for linear low density polyethylene (LLDPE) occurs at an apparent shear stress of $1-1.4\times 10^6$ dyne/cm², which was observed to be coincident with the change in slope of the flow curve. Ramamurthy also discloses that the onset of surface melt fracture or of gross melt fracture for high pressure low density polyethylene (HP-LDPE) occurs at an apparent shear stress of about 0.13 MPa ($1.3\times 10^6$ dynes/cm²).

Kalika and Denn in *Journal of Rheology*, 31, 815–834 (1987), the discourse of which is incorporated herein by reference, confirmed the surface defects or sharkskin phenomena for LLDPE, but the results of their work determined a critical shear stress of $2.3\times 10^6$ dyne/cm², significantly higher than that found by Ramamurthy and Moynihan et al.

In this disclosure, the onset of surface melt fracture (OSMF) is characterized at the beginning of losing extrudate gloss at which the surface roughness of extrudate can only be detected by 40 X magnification. Surprisingly, the critical shear rate at onset of surface melt fracture for the substantially linear ethylene/α-olefin interpolymers and copolymers is at least 50 percent greater than the critical shear rate at the onset of surface melt fracture of a linear ethylene/α-olefin interpolymer or copolymer (either a heterogeneously branched polymer (e.g., LLDPE) or a homogeneously branched polymer (e.g., that described in U.S. Pat. No. 3,645,992 (Elston)) having about the same or substantially the same $I_2$ and $M_w/M_n$ and the same comonomer(s).

The critical shear rate and critical shear stress at onset of surface melt fracture (OSMF) and onset of gross melt fracture (OGMF) will be used herein based on the changes of surface roughness and configurations of the extrudates extruded by a GER. In contrast to both LLDPE and high pressure LDPE, the critical shear stress at onset of gross melt fracture for the substantially linear ethylene/α-olefin interpolymers and copolymers, especially those having a density greater than about 0.9 g/cm³, is greater than about $4\times 10^6$ dynes/cm².

Films and Film Structures

The films and film structures disclosed herein can be monolayer or multilayer film structures, with the proviso that the homogeneously branched substantially linear ethylene/α-olefin copolymers and interpolymers be used as at least one layer, preferably the seal layer. The thickness of the seal layer may be from at least about 0.1 mil (2.5 microns) and greater, preferably from about 0.2 mil (5 microns) to about 10 mil (254 microns) and more preferably from 0.4 mil (10 microns) to 5 mil (127 microns).

A surprising feature of the pouch's film structure of the present invention is the film's broad heat sealing range, especially in view of the substantially linear ethylene polymer's narrow melting point range (measured using differential scanning calorimetry (DSC)). Generally, the heat sealing range of the film structure can be from about 50° C. to about 160° C. and preferably from about 75° C. to about 130° C. It has been found that the seal layer of the present invention has a broader heat seal range than prior art polyethylene film made from heterogeneously branched ethylene polymers, even at the approximately the same density. A broad heat sealing range is important to allow for more flexibility in the heat sealing process used for making pouches from the film structure. Generally, the melting point range of the substantially linear ethylene polymer used to make the film structure having the heat seal ranges specified above can be from about 50° C. to about 130° C. and preferably from about 55° C. to about 115° C.

Another unexpected feature of the pouch's film structure of the present invention is the film's heat seal strength at low temperatures. Generally, the film structure of the present invention achieves a hot tack strength of at least about 1N/inch (39.4N/m) at a seal bar temperature of about 110° C. and at less than about 0.3 seconds using the DTC Hot Tack Strength Method defined hereinbelow or achieves a heat seal strength of at least 1 lb./inch (175 N/m) at a seal bar temperature of about 110° C. and at less than 0.4 seconds using the DTC Heat Seal Strength Method defined hereinbelow. The film structure of the present invention also has a hot tack or heat seal initiation temperature of less than about 110° C. at a force of at least about 1N/inch (39.4N/m). It has been found that a seal made with the seal layer of the present invention has a higher strength at lower sealing temperatures than seals with a prior art polyethylene having higher densities. A high heat seal strength at low temperatures is important to allow conventional packaging equipment such as a vertical form, fill and seal machine to run at faster rates and to produce pouches with fewer leakers.

It is believed that the use of at least one substantially linear ethylene polymer in a seal layer of a film structure for pouches of the present invention (1) provides a pouch that can be fabricated at a fast rate through a form, fill and seal machine and (2) provides a pouch package having few leakers, particularly when the pouch of the present invention is compared to pouches made with linear low density polyethylene, ultra linear low density polyethylene, high pressure low density polyethylene, or a combination thereof.

In one embodiment of the present invention, a pouch is made from a film structure in tubular form and having transversely heat sealed ends. The film structure has at least one film layer comprising:

(I) from 10 to 100 percent by weight of at least one layer comprising at least one homogeneously branched substantially linear ethylene/α-olefin interpolymer characterized as having:
(a) a melt flow ratio, $I_{10}/I_2$, >5.63, and
(b) a molecular weight distribution, $M_w/M_n$, defined by the equation: $M_w/M_n < (I_{10}/I_2) - 4.63$; and (II) from 0 to 90 percent by weight of at least one polymer selected from the group consisting of a heterogeneously branched linear ethylene/$C_3$–$C_{18}$ α-olefin copolymer, a high-pressure low density polyethylene, and an ethylene-vinyl acetate copolymer.

The heterogeneously branched linear ethylene/$C_3$–$C_{18}$ α-olefin copolymer of (II) is generally a linear low density polyethylene (such as that made using Ziegler catalysis). The linear low density polyethylene is often further divided into subsets labeled as very low density polyethylene (VLDPE) or ultra low density polyethylene (ULDPE). VLDPE and ULDPE are interchangeable terms herein and are generally used in this manner by those skilled in the art. Generally, the density of the linear low density polyethylene of (II) ranges from about 0.87 g/cm³ to about 0.94 g/cm³, preferably from about 0.87 g/cm³ to about 0.915 g/cm³. Preferably, the heterogeneously branched linear low density ethylene/$C_3$–$C_{18}$ α-olefin copolymer of (II) has a melt index from 0.1 to 10 g/10 minutes.

Preferably, the high-pressure low density polyethylene of (II) has a density from 0.916 to 0.93 g/cm³ and a melt index from 0.1 to 10 g/10 minutes.

Preferably, the ethylene-vinyl acetate copolymer of (II) has a weight ratio of ethylene to vinyl acetate from 2.2:1 to 24:1 and a melt index from 0.2 to 10 g/10 minutes.

Another embodiment of the present invention includes a pouch made from a blend of:

(a) from 10 to 100 percent by weight of at least one homogeneously branched substantially linear ethylene copolymer interpolymerized from ethylene and at least one alpha-olefin in the range of $C_3$–$C_{20}$ and having a density of less than about 0.915 g/cm³ and a melt index of less than about 10.0 g/10 minutes, and (b) from 0 to 90 percent by weight of at least one polymer selected from the group consisting of a heterogeneously branched linear ethylene/$C_3$–$C_{18}$ α-olefin copolymer, a high-pressure low-density polyethylene and an ethylene-vinyl acetate (EVA) copolymer.

The heterogeneously branched linear ethylene/$C_3$–$C_{18}$ α-olefin copolymer of (II) generally is a linear low density polyethylene (such as that made using Ziegler catalysis). The linear low density polyethylene includes very low density polyethylene (VLDPE) and ultra low density polyethylene (ULDPE), as described previously. Generally, the density of the linear low density polyethylene of (II) ranges from about 0.87 g/cm³ to about 0.94 g/cm³, preferably from about 0.87 g/cm³ to about 0.915 g/cm³. Preferably, the heterogeneously branched linear low density ethylene/$C_3$–$C_{18}$ α-olefin copolymer of (II) has a melt index from 0.1 to 10 g/10 minutes.

Preferably, the high-pressure low density polyethylene of (b) has a density from 0.916 to 0.93 g/cm³ and a melt index from 0.1 to 10 g/10 minutes.

Preferably, the ethylene-vinyl acetate copolymer of (b) has a weight ratio of ethylene to vinyl acetate from 2.2:1 to 24:1 and a melt index from 0.2 to 10 g/10 minutes.

Figure 3:
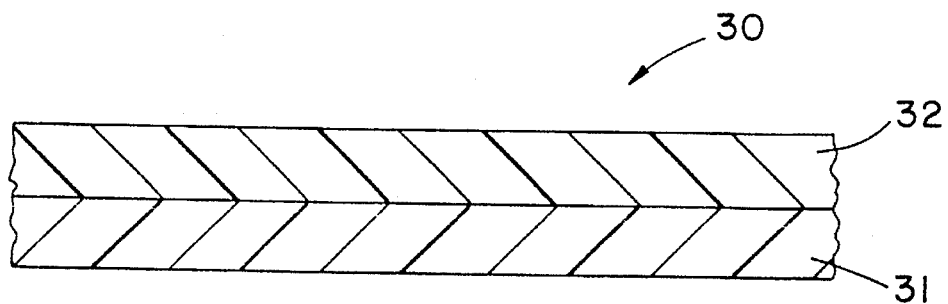
FIG. 3 shows a partial, enlarged cross-sectional view of the film structure of a pouch of the present invention.
Figure 4:
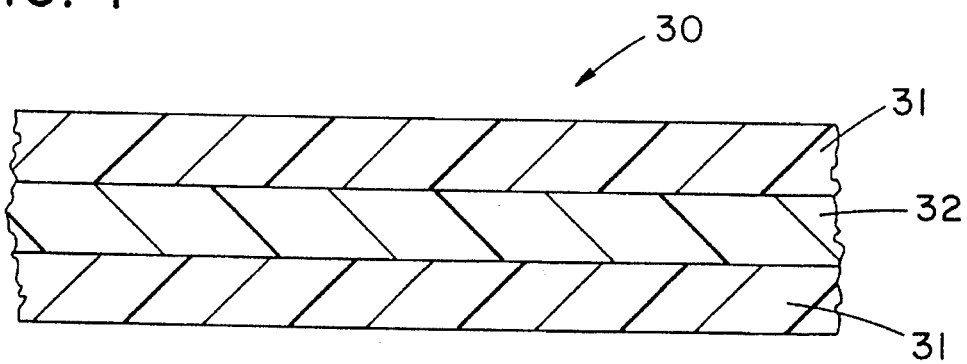
FIG. 4 shows another partial, enlarged cross-sectional view of another embodiment of the film structure of a pouch of the present invention.
Figure 5:
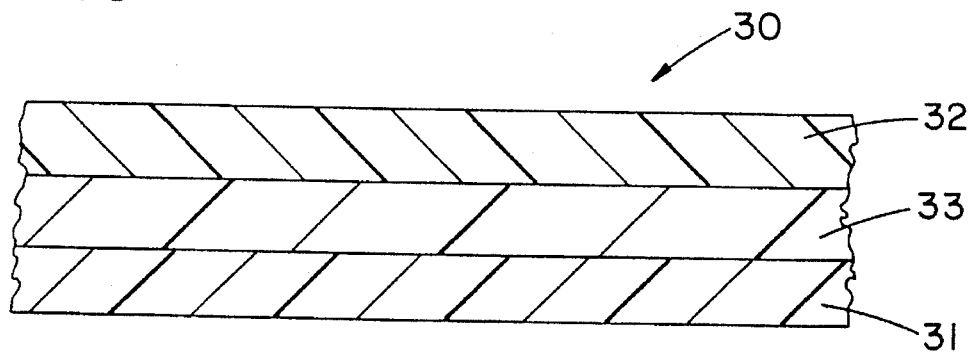
FIG. 5 shows yet another partial, enlarged cross-sectional view of another embodiment of the film structure of a pouch of the present invention.

With reference to FIGS. 3 to 5, the film structure of the pouch of the present invention also includes a multilayer or composite film structure 30, preferably containing the above-described polymeric seal layer being the inner layer of the pouch.

As will be understood by those skilled in the art, the multilayer film structure for the pouch of the present invention may contain various combination of film layers as long as the seal layer forms part of the ultimate film structure. The multilayer film structure for the pouch of the present invention may be a coextruded film, a coated film or a laminated film. The film structure also includes the seal layer in combination with a barrier film such as polyester, nylon, EVOH, polyvinylidene dichloride (PVDC) such as Saran™ (Trademark of The Dow Chemical Company) and metallized films. The end use for the pouch tends to dictate, in a large degree, the selection of the other material or materials used in combination with the seal layer film. The pouches described herein will refer to seal layers used at least on the inside of the pouch.

One embodiment of the film structure 30 for the pouch of the present invention, shown in FIG. 3, comprises a homogeneously branched substantially linear ethylene polymer seal layer 31 and at least one polymeric outer layer 32. The polymeric outer layer 32 is preferably a polyethylene film layer, more preferably a heterogeneously branched linear polyethylene referred to hereinafter as "linear low density polyethylene" ("LLDPE") and/or "ultra linear low density polyethylene" ("ULDPE") and/or "very low density polyethylene CVLDPE"). An example of a commercially available LLDPE is DOWLEX® 2045 (Trademark of and commercially available from The Dow Chemical Company). An example of a commercially available ULDPE is ATTANE®

4201 (Trademark of and commercially available from The Dow Chemical Company).

The LLDPE (including both the VLDPE and ULDPE) useful herein are heterogeneously branched linear copolymers of ethylene and a minor amount of an alpha-olefin having from 3 to about 18 carbon atoms, preferably from 4 to about 10 carbon atoms (e.g., 1-butene, 4-methyl-1-pentene, 1-hexene, 1-octene, and 1-decene)and most preferably 8 carbon atoms (e.g., 1-octene). Generally, the heterogeneously branched LLDPE are made using Ziegler catalysis (e.g., using the method described in U.S. Pat. No. 4,076,698 (Anderson et al.), the disclosure of which is incorporated herein by reference).

The LLDPE for the outer layer 32 generally has a density greater than 0.87 g/cm$^3$, more preferably from about 0.9 to about 0.93 g/cm$^3$; generally has a melt index ($I_2$) front about 0.1 to about 10 g/10 min, preferably from about 0.5 to about 2 g/10 min; and generally has an $I_{10}/I_2$ ratio from about 5 to about 20, preferably from about 7 to about 20.

For the heterogeneously branched LLDPE (including both VLDPE and UDLPE), the $I_{10}/I_2$ ratio tends to increase as the molecular weight ($M_w/M_n$) of the LLDPE increases, in surprising contradistinction to the novel homogeneously branched substantially linear ethylene/α-olefin interpolymers and copolymers discussed herein.

The thickness of the outer layer 32 may be any thickness so long as the seal layer 31 has a minimum thickness of about 0.1 mil (2.5 microns).

Another embodiment of the film structure 30 for the pouch of the present invention, shown in FIG. 4, comprises the polymeric layer 32 sandwiched between two polymeric seal layers 31.

Still another embodiment of the film structure 30 for the pouch of the present invention, shown in FIG. 5, comprises at least one polymeric core layer 33 between at least one polymeric outer layer 32 and at least one polymeric seal layer 31. The polymeric layer 33 may be the same LLDPE film layer as the outer layer 32 or preferably a different LLDPE, and more preferably an LLDPE that has a higher density than the outer layer 32. The thickness of the core layer 33 may be any thickness so long as the seal layer 31 has a minimum thickness of about 0.1 mil (2.5 microns).

Yet another embodiment (not shown) of the film structure for the pouch of the present invention can be a structure including a seal layer 31 and another polyethylene film layer referred to hereinafter as "high pressure low-density polyethylene" ("LDPE"). The LDPE layer generally has a density from about 0.916 to about 0.930 g/cm$^3$ and has a melt index from about 0.1 to about 10 g/10 min. The thickness of the LDPE layer may be any thickness so long as the seal layer 31 has a minimum thickness of about 0.1 mil (2.5 microns).

Still another embodiment (not shown) of the film structure for the pouch of the present invention can be a structure including a seal layer 31 and a layer of EVA copolymer having a weight ratio of ethylene to vinyl acetate from 2.2:1 to 24:1 and a melt index of from 0.2 to 20 g/10 min. The thickness of the EVA layer may be any thickness so long as the seal layer 31 has a minimum thickness of about 0.1 mil (2.5 microns).

The thickness of the film structure used for making the pouch of the present invention is from about 0.5 mil (12.7 microns) to about 10 mils (254 microns), preferably from about 1 mil (25.4 microns) to about 5 mils (127 microns).

As can be seen from the different embodiments of the present invention shown in FIGS. 3–5, the film structure for the pouches of the present invention has design flexibility.

Different LLDPEs (e.g., VLDPE and ULDPE) can be used in the outer and core layers to optimize specific film properties such as film stiffness. Thus, the film can be optimized for specific applications such as for a vertical form, film and seal machine.

The polyethylene film structure used to make a pouch of the present invention is made by either the blown tube extrusion method or the cast extrusion method, methods well known in the art. The blown tube extrusion method is described, for example, in Modern Plastics Mid-October 1989 Encyclopedia Issue, Volume 66, Number 11, pages 264 to 266. The cast extrusion method is described, for example, in Modern Plastics Mid-October 1989 Encyclopedia Issue, Volume 66, Number 11, pages 256 to 257.

Embodiments of the pouches of the present invention, shown in FIGS. 1 and 2, are hermetically sealed containers filled with "flowable materials". By "flowable materials" it is meant materials which are flowable under gravity or which may be pumped, but the term "flowable materials" does not include gaseous materials. The flowable materials include noncarbonated liquids (e.g., milk, water, fruit juice, wine) and carbonated liquids (e.g., soda, beer, water); emulsions (e.g., ice cream mix, soft margarine); pastes (e.g., meat pastes, peanut butter); preserves (e.g., jams, pie fillings, marmalade); jellies; doughs; ground meat (e.g., sausage meat); powders (e.g., gelatin powders, detergents); granular solids (e.g., nuts, sugar, cereal); and like materials. The pouch of the present invention is particularly useful for packaging liquids (e.g., milk). The flowable material may also include oleaginous liquids (e.g., cooking oil or motor oil).

Once the film structure for the pouch of the present invention is made, the film structure is cut to the desired width for use in conventional pouch-forming machines. The embodiments of the pouch of the present invention shown in FIGS. 1 and 2 are made in so-called form, fill and seal machines well known in the art. With regard to FIG. 1, there is shown a pouch 10 being a tubular member 11 having a longitudinal lap seal 12 and transverse seals 13 such that, a "pillow-shaped" pouch is formed when the pouch is filled with flowable material.

With regard to FIG. 2, there is shown a pouch 20 being a tubular member 21 having a peripheral fin seal 22 along three sides of the tubular member 11, that is, the top seal 22a and the longitudinal side seals 22b and 22c, and having a bottom substantially concave or "bowl-shaped" member 23 sealed to the bottom portion of the tubular seal 21 such that when viewed in cross-section, longitudinally, substantially a semi-circular or "bowed-shaped" bottom portion is formed when the pouch is filled with flowable material. The pouch shown in FIG. 2 is the so-called "Enviro-Pak" pouch known in the art.

The pouch manufactured according to the present invention is preferably the pouch shown in FIG. 1 made on so-called vertical form, fill and seal (VFFS) machines well known in the art. Examples of commercially available VFFS machines include those manufactured by Hayssen or Prepac. A VFFS machine is described in the following reference: F. C. Lewis, "Form-Fill-Seal," Packaging Encyclopedia, page 180, 1980, the disclosure of which is incorporated herein by reference.

In a VFFS packaging process, a sheet of the plastic film structure described herein is fed into a VFFS machine where the sheet is formed into a continuous tube in a tube-forming section. The tubular member is formed by sealing the longitudinal edges of the film together—either by lapping the plastic film and sealing the film using an inside/outside seal or by fin sealing the plastic film using an inside/inside seal. Next, a sealing bar seals the tube transversely at one end being the bottom of the "pouch", and then the fill material, for example milk, is added to the "pouch." The sealing bar then seals the top end of the pouch and either burns through the plastic film or cuts the film, thus, separating the formed completed pouch from the tube. The process of making a pouch with a VFFS machine is generally described in U.S. Pat. Nos. 4,503,102 and 4,521,437, the disclosures of which are both incorporated herein by reference.

The capacity of the pouches of the present invention may vary. Generally, the pouches may contain from about 5 milliliters to about 10 liters, preferably from about 10 milliliters to about 8 liters, and more preferably from about 1 liter to about 5 liters of flowable material.

The use of the homogeneously branched substantially linear ethylene/α-olefin interpolymer seal layer of the present invention in a two or three-layer coextruded film product will provide a film structure that can be used for making pouches at a faster rate in the VFFS and such pouches produced will contain fewer leakers.

The pouches of the present invention can also be printed by using techniques known in the art, e.g., use of corona treatment before printing.

The pouches of the present invention have excellent performance results when tested by the 5 Foot Drop Test—a test which is defined herein. Under the 5 Foot Drop Test, the pouches preferably have a percent failure of less than about 40 percent and more preferably less than about 20 percent, and especially less than about 10 percent.

Use of the pouch for packaging consumer liquids such as milk has its advantages over containers used in the past: the glass bottle, paper carton, and high density polyethylene jug. The previously used containers consumed large amounts of natural resources in their manufacture, required a significant amount of space in landfill, used a large amount of storage space and used more energy in temperature control of the product (due to the heat transfer properties of the container).

The pouches of the present invention made of thin film, used for liquid packaging, offers many advantages over the containers used in the past. The pouches: (1) consume less natural resources, (2) require less space in a landfill, (3) can be recycled, (4) can be processed easily, (5) require less storage space, (6) use less energy for storage (heat transfer properties of package), (7) can be safely incinerated and (8) can be reused (e.g., the empty pouches can be used for other applications such as freezer bags, sandwich bags, and general purpose storage bags).

Experimental

Coextruded blown film samples having an A/B/A structure are made using layer ratios of: A=15 percent (by weight of the total structure) and B=70 percent (by weight of the total structure). Layer B is an ethylene/1-octene LLDPE having a melt index ($I_2$) of about 1 g/10 minute and a density of about 0.92 g/cm$^3$ and does not contain additives. In the examples, resins 1–3 are all heterogeneously branched ethylene/1-octene copolymers and resins 4–7 are all homogeneously branched substantially linear ethylene/1-octene copolymers. Table 1 summarizes physical properties of the resins used to make A/B/A coextruded blown film samples described in the examples and comparative examples:

TABLE 1

| Resin | Resin type | Melt Index ($I_2$) (g/10 min) | Density (g/cm$^3$) | $M_w/M_n$ | $I_{10}/I_2$ |
|---|---|---|---|---|---|
| 1* | LLDPE | 1 | 0.92 | 3.73 | 8 |
| 2* | ULDPE | 1 | 0.912 | 4.03 | 8.2 |
| 3* | ULDPE | 1 | 0.905 | 4.2 | 8.7 |
| 4 | SLEP | 1.03 | 0.8713 | 2.11 | 7.81 |
| 5 | SLEP | 1 | 0.902 | 2.02 | 9.3 |
| 6 | SLEP | 0.97 | 0.9104 | 2.2 | 10.05 |
| 7 | SLEP | 1.01 | 0.918 | 2.27 | 9.48 |
| 8* | SM3 Film made by DuPont | NA | NA | NA | NA |

*Comparative example
NA = Not applicable

Resins 1, 2, 5, 6, and 7 are dry blended to contain 4,000 ppm SiO$_2$ and 1,200 ppm Erucamide. Resin 3 is dry blended to contain 6,000 ppm SiO$_2$ and 1,200 ppm Erucamide. Resin 4 is dry blended to contain 14,000 ppm SiO$_2$ and 1,200 ppm Erucamide. Resin 8 is a monolayer milk pouch film designated "SM3" made by and available from DuPont Canada and is believed to be a blend of about 8% (by weight) of a low density polyethylene having a density of about 0.92 g/cm$^3$ and about 92% (by weight) of a heterogeneously branched linear low density polyethylene. The SM3 film has a final film density reported by DuPont as 0.918 g/cm$^3$.

Film samples are produced on an Egan three layer extruder system. Extruder A has a 2.5 inch diameter (Barr2 type) screw equipped with a Maddox mixer, L/D of 24:1, 60 HP drive. Extruder B has a 2.5 inch diameter (DSB II type) screw equipped with a Maddox mixer, L/D of 24:1, 75 HP drive. Extruder C has a 2 inch diameter (Modified MHD (Johnson) type) screw equipped with a Maddox mixer, L/D of 24:1, 20 HP drive. The blown film line is also equipped with an 8 inch 3-layer coextruding die body, a Gloucester Tower, a Sano collapsing frame, a Sano bubble sizing cage, and a Sano bubble enclosure.

Each of the film samples is made at 3 mil target thickness using a blow-up ratio (BUR) of 2.5:1.

Each film is tested according to the following test methods:

Puncture: Puncture is measured by using an Instron Tensile Tester with an integrator, a specimen holder, and a puncturing device. The Instron is set to obtain a crosshead speed of 10 inches/minute and a chart speed (if used) of 10 inches/minute. Load range of 50% of the load cell capacity (100 lb. load for these tests) should be used. The puncturing device is installed to the Instron such that the clamping unit is attached to the lower mount and the ball is attached to the upper mount on the crosshead. Five film specimens are used (each 6 inches square). The specimen is clamped in the film holder and the film holder is secured to the mounting bracket. The crosshead travel is set and continues until the specimen breaks. Puncture resistance is defined as the energy to puncture divided by the volume of the film under test. Puncture resistance (PR) is calculated as follows:

PR=E/((12)(T)(A))

where PR=puncture resistance (ft-lbs/in$^3$),
E=energy (inch-lbs)=area under the load displacement curve,
12=inches/foot,
T=film thickness (inches), and
A=area of the film sample in the clamp=12.56 in$^2$;

Dart Impact: ASTM D1709, method A;

Elmendorf Tear: ASTM D 1922;

Tensile Properties: ASTM D882 using an Instron tensile tester (cross-head speed of 500 mm/min, full scale load of 5 kg, threshold of 1% of full scale load, break criterion of 80%, 2 inch gauge length and 1 inch sample width);

Coefficient of Friction: ASTM D1894. Coefficient of friction range is important in order for the film to properly move over the forming collars in a vertical-form-fill and seal machine (e.g., a Hayssen form-fill-seal machine): if the coefficient of friction is too low, the film may be too slippery for the pull belts to grip the film and if the coefficient of friction is too high, the film may be too tacky for the machine to pull the film over the forming collar; typical targets for the Hayssen form-fill-seal machine are:

(i) inside/outside coefficient of friction from 0.10–0.30 and (ii) outside/outside coefficient of friction from 0.10–040;

1% and 2% Secant Modulus: ASTM D882. Film stiffness is important, especially for "free-standing" pouches like that shown in FIG. 2. The 1% and 2% secant modulus tests provide an indication of the stiffness of the film;

Heat Sear Strength: This test measures the force required to separate a seal after the seal has been allowed to cool. Seals are made using the DTC Hot Tack Tester but only the heat seal portion of the unit is used. Conditions used are:

Specimen width: 24.4 mm
Sealing time: 0.5 seconds
Sealing pressure: 0.27 N/mm/mm
No. samples/time: 5
Temperature increments: 5° C.

Seal strength is determined using an Instron Tensile Tester Model No. 1122. The film samples are exposed to relative humidity of 50% and a temperature of 23° C. for 24–48 hours prior to testing. Instron test conditions are as follows:

Direction of pull: 90° to seal
Crosshead speed: 500 mm/minute
Full scale load (FSL): 5 kg
Threshold: 1% of FSL
Break Criterion: 80%
Gauge length: 2.0 inches and
Sample width: 1.0 inch;

Heat Seal Strength Versus Sealing Time: Films are sealed using a DTC Hot Tack Tester model no. 52D. Conditions used are as follows:

Specimen width: 24.4 mm
Sealing time: varied
Sealing pressure: 0.27 N/mm/mm
No. samples/time: 5
Sealing temperature range: 0.1 seconds–1.0 seconds
Temperature: 105° C.

The seal strength is determined using an Instron Tensile Tester Model No. 1122 using the conditions described in the Heat seal Strength test.

Hot Tack Performance: The hot tack test measures the force required to separate a heat seal before the seal has had a chance to cool. This test simulates filling a pouch with material just after the seal was made. The hot tack strength is typically the limiting factor in increasing line speeds of a pouch manufacturing and filling operation.

In this test, the films are tested using a DTC Hot Tack Tester Model No. 52D. Conditions used are:

Specimen width: 24.4 mm
Sealing Time: 0.5 seconds
Sealing Pressure: 0.27 N/mm/mm
Delay Time: 0.5 seconds
Peel Speed: 150 mm/sec
Number of samples/temperature: 5
Temperature Increments: 5° C.
Temperature Range: 70° C.–130° C.

Hot tack failure of the seals generally occurs in three stages: no seal; seals which pull apart (peeling); and film failure (where the molten film pulls apart with no apparent effect on the seal). Film failure region begins where the hot tack strength reaches a maximum level. In each case, film failure occurs just in front of the seal. A force of 1N/inch is arbitrarily selected to determine the seal initiation temperature.

Water Filled Pouch Performance: Pouches are manufactured using a Hayssen Ultima VFFS unit and contain 2 L of water. The following conditions are used on the Hayssen:

Model No.: RCMB@-PRA
M.A. No. U19644
Mass of water=2,000 grams
Bag size=7 inches by 12.5 inches
Film width=15.25 inches
Registration Rolls: on from 5° to 135°
Pull Belts: on from 10° to 140°
Knife: on from 146° to 265°
Jaw close: from 136° to 275°
Platen: on from 136° to 265°
Stager: off
Auxiliary: on front 137° to 355°
Quali-seal: on from 140° to 265°
Start Delay: 50 ms
Bag eject: on
End air seal: 200 ms
Empty bags/minute: 60
Filled bags/minute: 15
Seal bar pressure: 150 psi
Type of side seal: lap, and
Seam seal temperature: 260° F.

A Pro/Fill 3000 liquid filler is attached to the VFFS. The settings on the Pro/Fill 3000 are: P.S.=35, volume=0903, and C.O.A.= 70;

(i) End Heat Seal Strength: Water filled pouches are made using sealing bar temperatures starting at 280° F. Five pouches are made at this temperature, then the sealing bar temperature is reduced in 5° F. increments until the pouches no longer hold water. Five pouches are obtained from each temperature, the water drained, and the empty pouch tested for seal strength using an Instron Tensile Tester Model No. 1122 using the conditions described in the Heat seal Strength test.

At the seal bar temperature where the pouch no longer holds water, the force of the water being pumped into the pouch is believed to be too great for the hot, semi-molten seal. As a result, the seal separates and it appears that the pouch experiences hot tack failure at this temperature;

(ii) 5 Foot Drop Test: The seal bar temperature is set to 250° F. and 100 pouches are made from each film structure. The pouches are dropped from a height of 5 feet such that the pouch lands on the platen seal.

Tables 2, 2A and 3–9 summarize physical property data for the A/B/A film structures made using the resins described in Table 1. In the Tables, "MD" means machine direction and "CD" means cross/transverse direction.

TABLE 2

| Resin | 1** | 2** | 3** | 4 | 5 | 6 | 7 | 8** |
|---|---|---|---|---|---|---|---|---|
| Avg. gauge (mils) | 3.09 | 3.03 | 3.04 | 2.29 | 3.18 | 3.08 | 3.10 | 3.17 |
| 1% secant modulus (psi) (MD) (MPa) | 31,928 (220) | 28,504 (197) | 27,873 (192) | 21,154 (146) | 25,291 (174) | 28,422 (196) | 29,251 (202) | NM* |
| 1% secant modulus (psi) (CD) (MPa) | 39,638 (273) | 30,334 (209) | 31,274 (216) | 24,781 (171) | 28,022 (193) | 30,696 (212) | 35,169 (242) | NM* |
| 2% secant modulus (psi) (MD) (MPa) | 28,509 (197) | 24,218 (167) | 23,951 (165) | 17,622 (122) | 21,845 (151) | 24,738 (171) | 26,094 (180) | 22,800 (157) |
| 2% secant modulus (psi) (CD) (MPa) | 33,730 (233) | 26,087 (180) | 26,783 (185) | 19,322 (133) | 24,009 (166) | 26,754 (184) | 30,130 (208) | 25,449 (175) |
| Elmendorf tear (g/mil) (MD) | 534 | 530 | 524 | 283 | 480 | 586 | 510 | 239 |
| Elmendorf tear (g/mil) (CD) | 654 | 644 | 638 | 527 | 685 | 640 | 632 | 394 |
| Dart Impact (g) | 596 | 751 | 889 | >1000 | 897 | 841 | 681 | 465 |
| Puncture (ft-lbs/in$^3$) (J/cm$^3$) | 26.0 (2.15) | 25.8 (2.13) | 26.5 (2.19) | 52.0 (4.3) | 27.8 (2.3) | 27.7 (2.29) | 24.2 (2) | 13.8 (1.14) |
| Tensile yield (psi) (MD) (MPa) | 1580 (10.9) | 1334 (9.2) | 1308 (9) | 1145 (7.9) | 1278 (8.8) | 1368 (9.4) | 1500 (10.3) | 1558 (10.7) |
| Tensile yield (psi) (CD) (MPa) | 1732 (11.9) | 1417 (9.8) | 1395 (9.6) | 1050 (7.2) | 1342 (9.3) | 1452 (10) | 1614 (11.1) | 1524 (10.5) |

*NM = Not measured
**Comparative Example Only

TABLE 2A

| Resin | 1** | 2** | 3** | 4 | 5 | 6 | 7 | 8** |
|---|---|---|---|---|---|---|---|---|
| Ultimate tensile (psi) (MD) (MPa) | 5511 (38) | 5338 (36.8) | 5369 (37) | 5086 (35.1) | 6386 (44) | 5653 (39) | 5794 (39.9) | 5639 (38.9) |
| Ultimate tensile (psi) (CD) (MPa) | 5768 (39.8) | 4873 (33.6) | 5145 (35.4) | 4293 (29.6) | 6065 (41.8) | 5310 (36.6) | 5697 (39.3) | 6173 (42.6) |
| Elongation (%) (MD) | 685 | 668 | 667 | 593 | 702 | 662 | 687 | 761 |
| Elongation (%) (CD) | 748 | 701 | 719 | 719 | 716 | 688 | 729 | 682 |
| Toughness (ft-lbs/in$^3$) (MD) (J/cm$^3$) | 1364 (113) | 1224 (101) | 1228 (102) | 1017 (84) | 1448 (120) | 1304 (108) | 1439 (119) | 1562 (129) |
| Toughness (ft-lbs/in$^3$) (CD) (J/cm$^3$) | 1549 (128) | 1222 (101) | 1293 (107) | 1043 (86) | 1399 (116) | 1298 (107) | 1507 (125) | 1569 (130) |

*NM = Not measured
**Comparative Example Only

The data in Tables 2 and 2A show that films made using both the heterogeneously branched ethylene/α-olefin copolymers and those made using the novel homogeneously branched substantially linear ethylene/α-olefin interpolymer have higher puncture resistance than the commercially available SM3 film.

Similarly, the data also show that films made using both the heterogeneously branched ethylene/α-olefin copolymers and those made using the novel homogeneously branched substantially linear ethylene/α-olefin interpolymer have higher dart impact strength than the commercially available SM3 film. Furthermore, films made using the homogeneously branched substantially linear ethylene/α-olefin interpolymer having higher dart impact strength than either the SM3 film or film made using heterogeneously branched ethylene/α-olefin copolymers.

Elmendorf tear also is higher for films made from both the heterogeneously branched ethylene/α-olefin copolymers and those made using the novel homogeneously branched substantially linear ethylene/α-olefin interpolymer, as compared with the commercially available SM3 film.

TABLE 3

| Resin | 1** | 2** | 3** | 4 | 5 | 6 | 7 | 8** |
|---|---|---|---|---|---|---|---|---|
| Coefficient of friction Inside/inside | | | | | | | | |
| Static | 0.20 | 0.25 | 0.18 | 1.53 | 0.24 | 0.18 | 0.20 | 0.14 |
| Kinetic | 0.18 | 0.23 | 0.16 | 1.35 | 0.20 | 0.16 | 0.18 | 0.10 |
| Coefficient of friction Outside/outside | | | | | | | | |
| Static | 0.20 | 0.25 | 0.23 | 0.90 | 0.26 | 0.14 | 0.18 | 0.12 |
| Kinetic | 0.17 | 0.24 | 0.22 | 1.03 | 0.23 | 0.13 | 0.16 | 0.10 |

**Comparative Example Only

The data in Table 3 shows that all of the films tested, except for that made using Resin 4, had a COF between 0.1 and 0.3.

TABLE 4

| | Hot Tack Strength (N/inch; N/25 mm)) | | | | | | | |
|---|---|---|---|---|---|---|---|---|
| Temperature °C. (°F.) | Resin 1** | Resin 2** | Resin 3** | Resin 4 | Resin 5 | Resin 6 | Resin 7 | Resin 8** |
| 55 (131) | NA | NA | NA | 0.16 | NA | NA | NA | NA |
| 65 (149) | NA | 0.10 | NA | 0.66 | NA | NA | NA | NA |
| 70 (158) | NA | 0.10 | 0.10 | 2.83 | 0.10 | NA | NA | NA |
| 75 (167) | NA | 0.10 | 0.90 | 5.11 | 0.48 | NA | NA | NA |
| 80 (176) | NA | 0.30 | 1.30 | 5.04 | 1.21 | 0.10 | NA | NA |
| 85 (185) | NA | 0.49 | 2.10 | 3.14 | 2.46 | 0.20 | NA | NA |
| 90 (194) | NA | 1.46 | 2.60 | 3.80 | 4.29 | 0.70 | 0.10 | NA |
| 95 (203) | 0 | 2.19 | 2.60 | 3.40 | 6.41 | 1.90 | 0.40 | 0 |
| 100 (212) | 0.40 | 2.78 | 3.10 | 3.21 | 6.95 | 4.30 | 0.90 | 0.30 |
| 105 (221) | 1.40 | 3.13 | 3.10 | 2.58 | 6.30 | 5.40 | 2.60 | 1.10 |
| 110 (230) | 2.90 | 3.06 | 3.00 | 2.39 | 5.80 | 5.70 | 4.20 | 2.10 |
| 115 (239) | 3.20 | 2.62 | 2.90 | 2.21 | 5.00 | 5.00 | 4.20 | 3.40 |
| 120 (248) | 3.30 | 2.41 | 3.00 | 1.64 | 4.20 | 4.20 | 4.00 | 3.60 |
| 125 (257) | 3.00 | 2.22 | 2.60 | 1.73 | 3.60 | 3.60 | 3.30 | 3.60 |
| 130 (266) | NM | 2.10 | NM | 1.36 | 2.90 | NM | NM | 3.50 |

**Comparative Example Only
NA = Not Applicable;
NM = Not Measured

The data in Table 4 shows that films made using the novel homogeneously branched substantially linear ethylene/α-olefin interpolymer have higher hot tack strength than film made from heterogeneously branched ethylene/α-olefin copolymers and higher hot tack strength than commercially available SM3 film.

Figure 6:
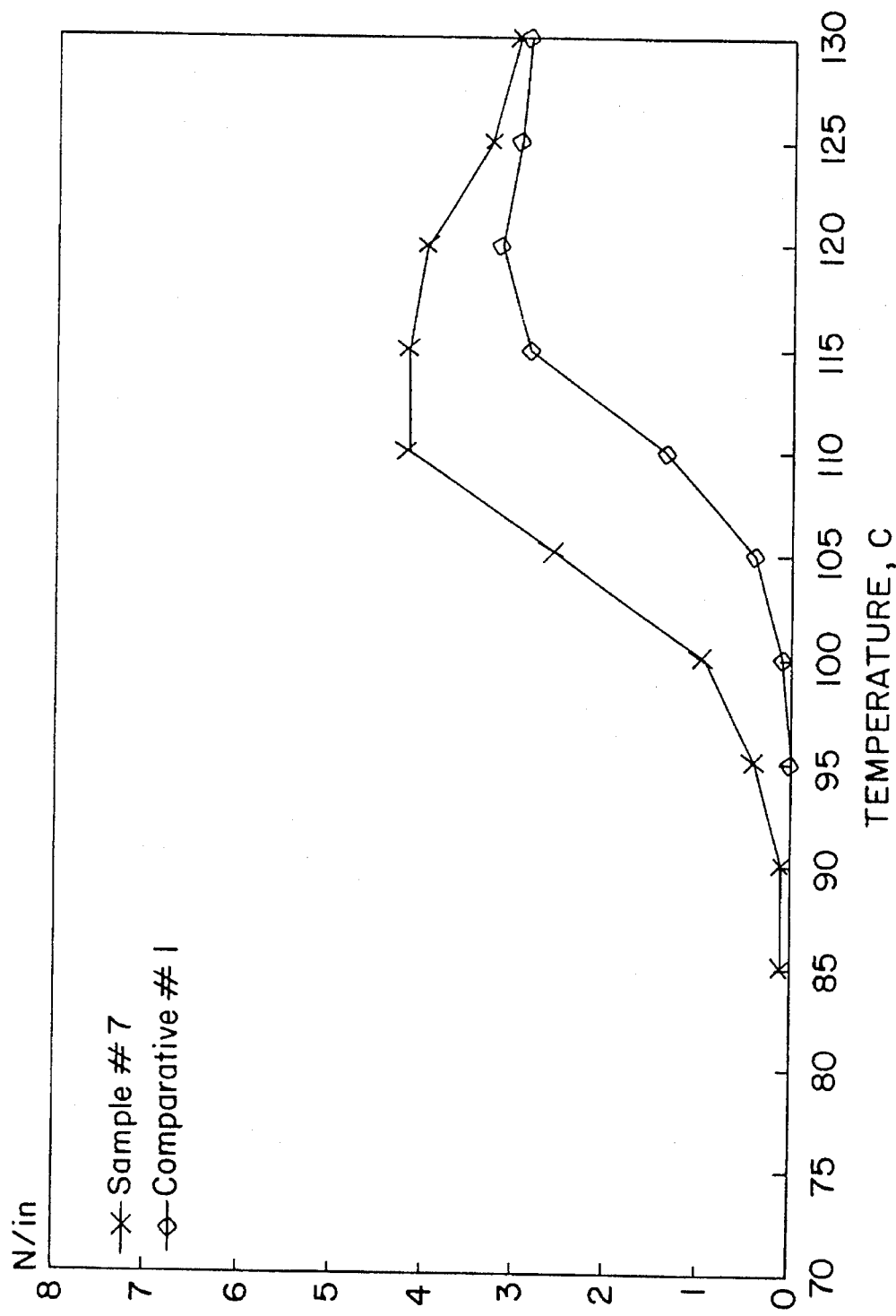
FIG. 6 is a graphical illustration of film hot tack strength versus temperature for resin 7 and comparative resin 1.

FIG. 6 is a graphical illustration of film hot tack strength versus temperature for resin 7 and comparative resin 1.

Figure 7:
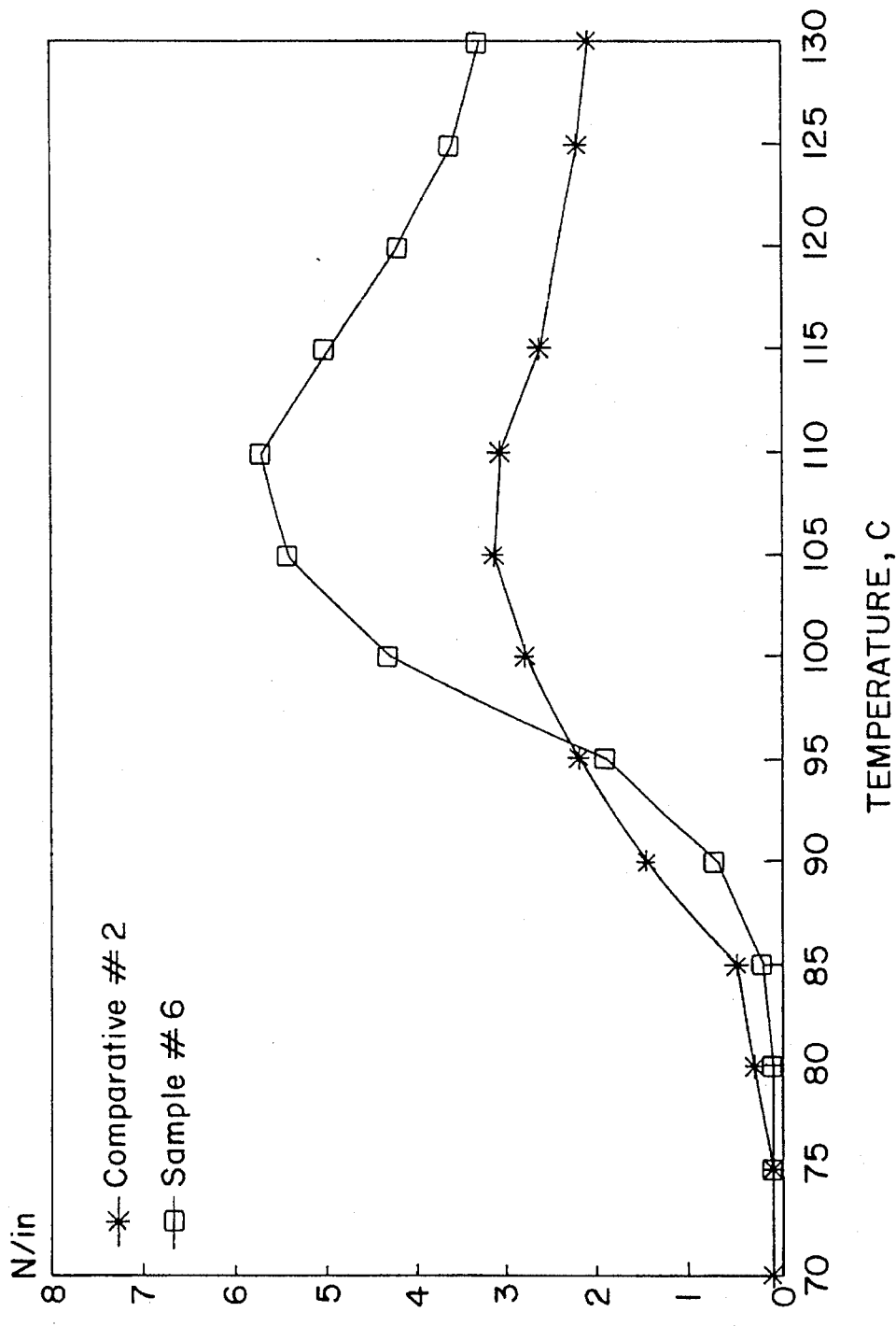
FIG. 7 is a graphical illustration of film hot tack strength versus temperature for resin 6 and comparative resin 2.

FIG. 7 graphically illustrates film hot tack strength versus temperature for resin 6 and comparative resin 2.

Figure 8:
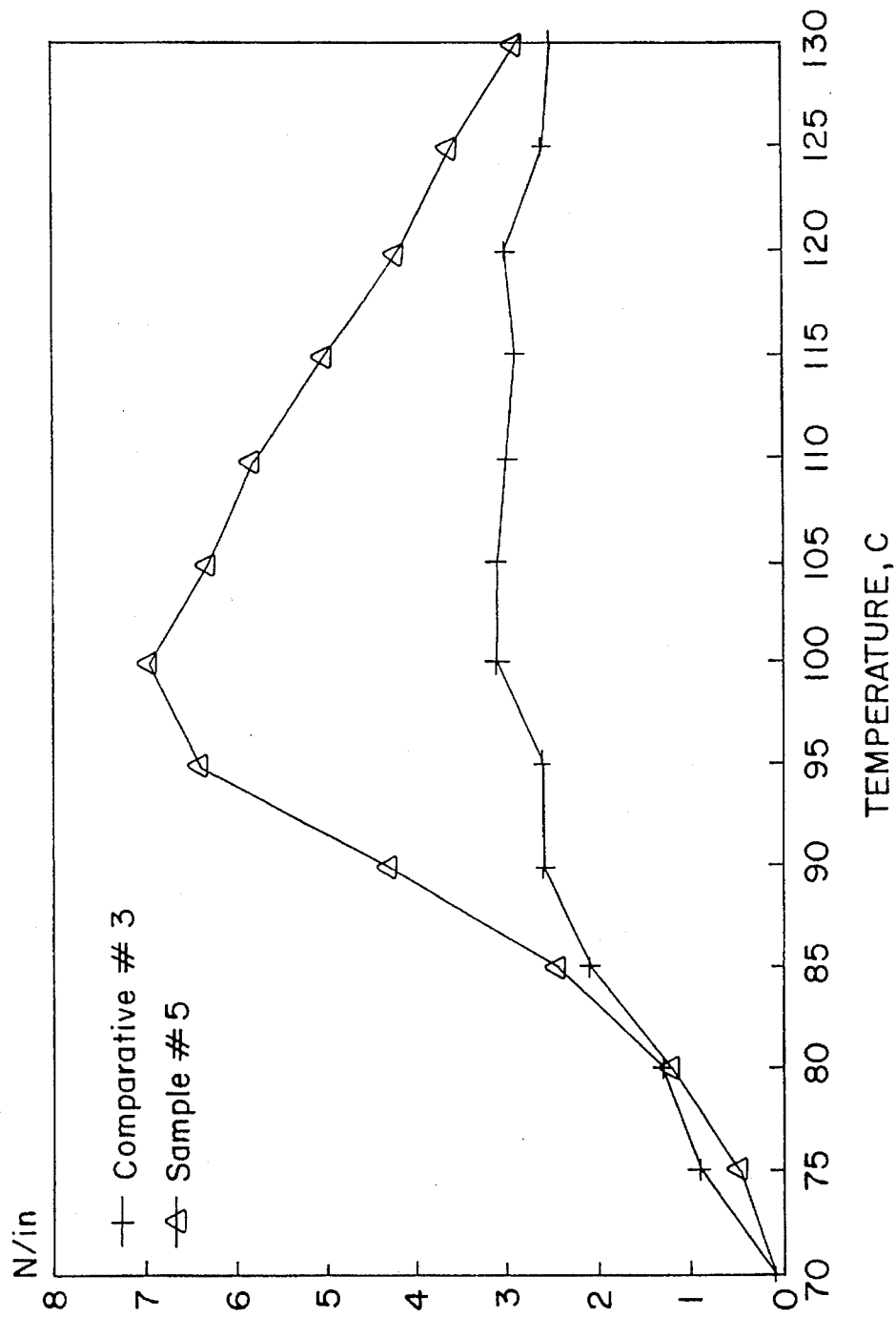
FIG. 8 is a graphical illustration of film hot tack strength versus temperature for resin 5 and comparative resin 3.

FIG. 8 is a graphical illustration of film hot tack strength versus temperature for resin 5 and comparative resin 3.

Figure 9:
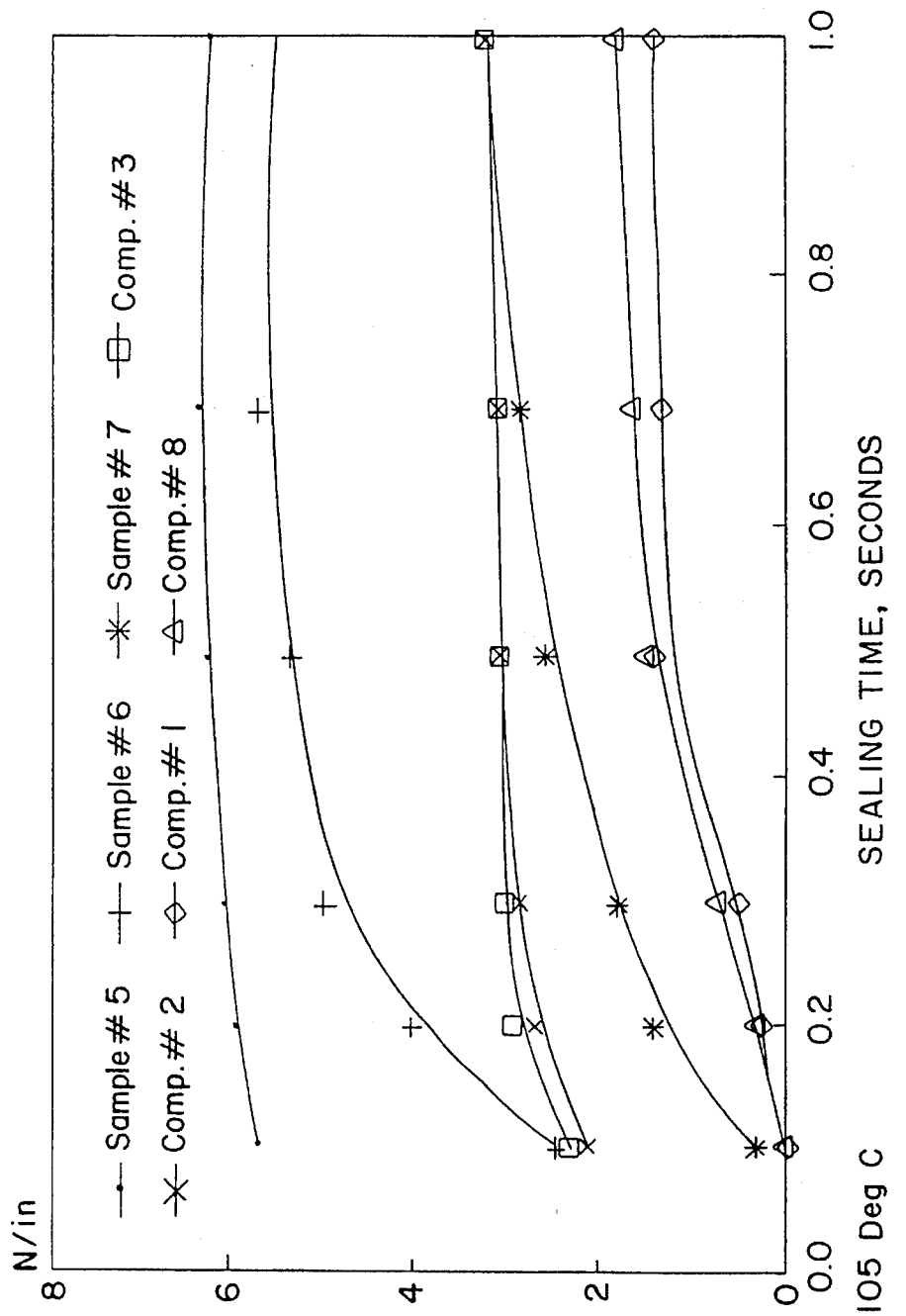
FIG. 9 is a graphical illustration of film hot tack strength versus sea_ling time for resins 5–7 and comparative resins 1–3 and comparative film 8.

FIG. 9 is a graphical illustration of film hot tack strength versus sealing time for resins 5–7 and comparative resins 1–3 and comparative film 8.

Figure 17:
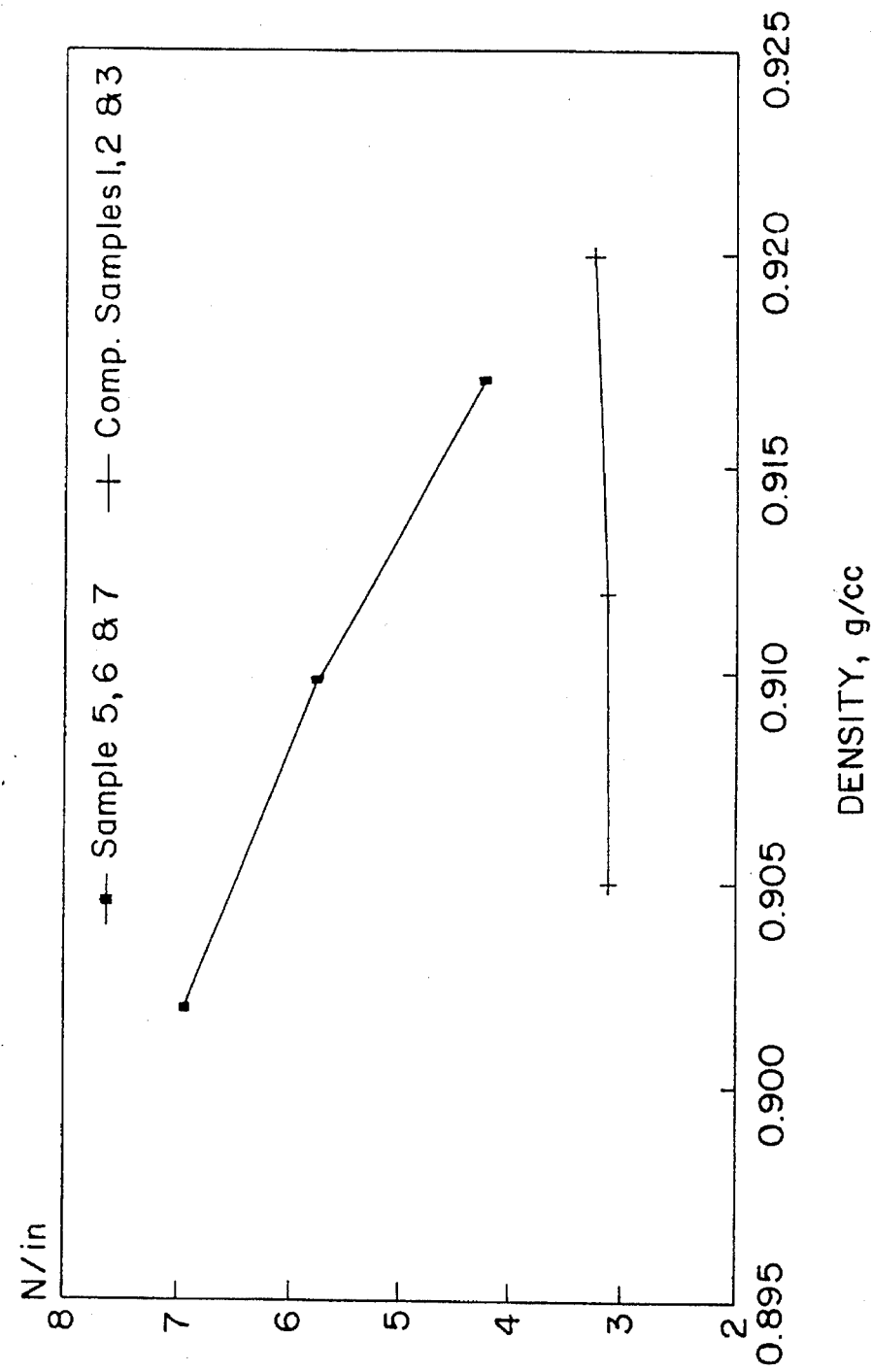
FIG. 17 is a graphical illustration of maximum film hot tack strength versus resin density for resins 5–7 and comparative resins 1–3.

FIG. 17 is a graphical illustration of maximum film hot tack strength versus resin density for resins 5–7 and comparative resins 1–3.

The data in Table 5 shows that films made using the novel homogeneously branched substantially linear ethylene/α-olefin interpolymer have higher heat seal strength than film made from heterogeneously branched ethylene/α-olefin copolymers and lower heat seal initiation temperatures than both the commercially available SM3 film and film made using heterogeneously branched ethylene/α-olefin copolymers.

Figure 10:
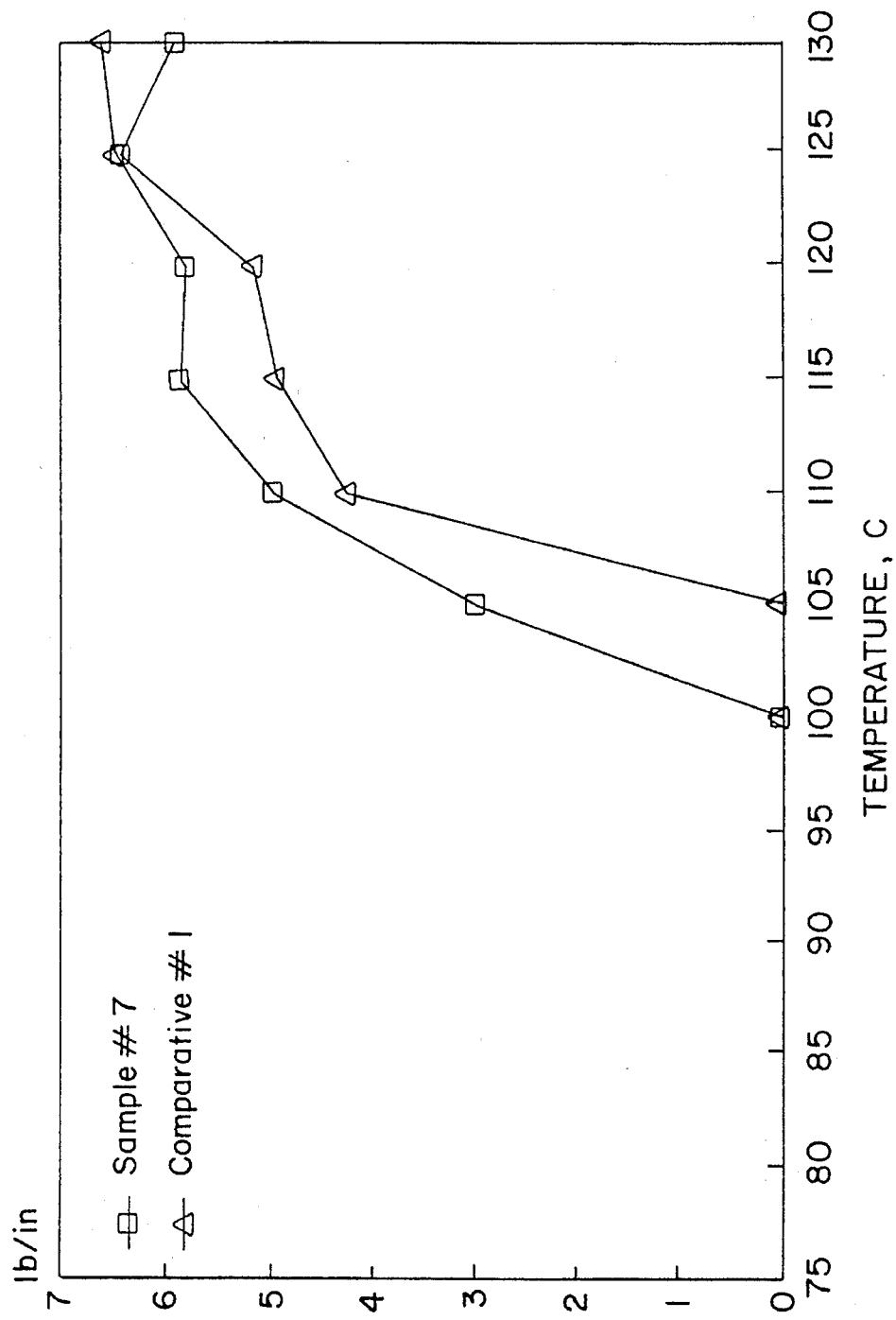
FIG. 10 is a graphical illustration of film heat seal strength versus temperature for resin 7 and comparative resin 1.

FIG. 10 is a graphical illustration of film heat seal strength versus temperature for resin 7 and comparative resin 1.

Figure 11:
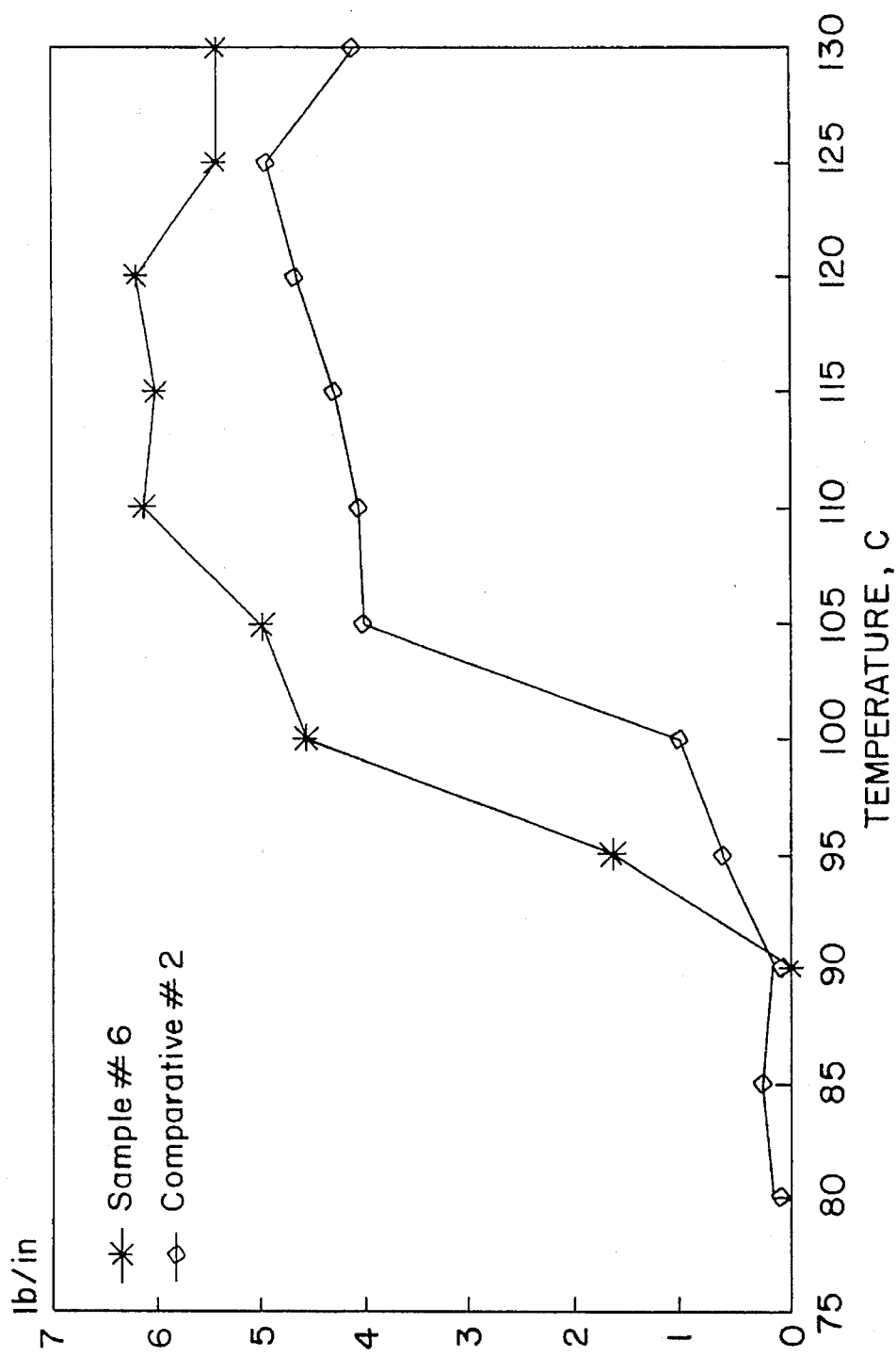
FIG. 11 is a graphical illustration of film heat seal strength versus temperature for resin 6 and comparative resin 2.

FIG. 11 is a graphical illustration of film heat seal strength versus temperature for resin 6 and comparative resin 2.

Figure 12:
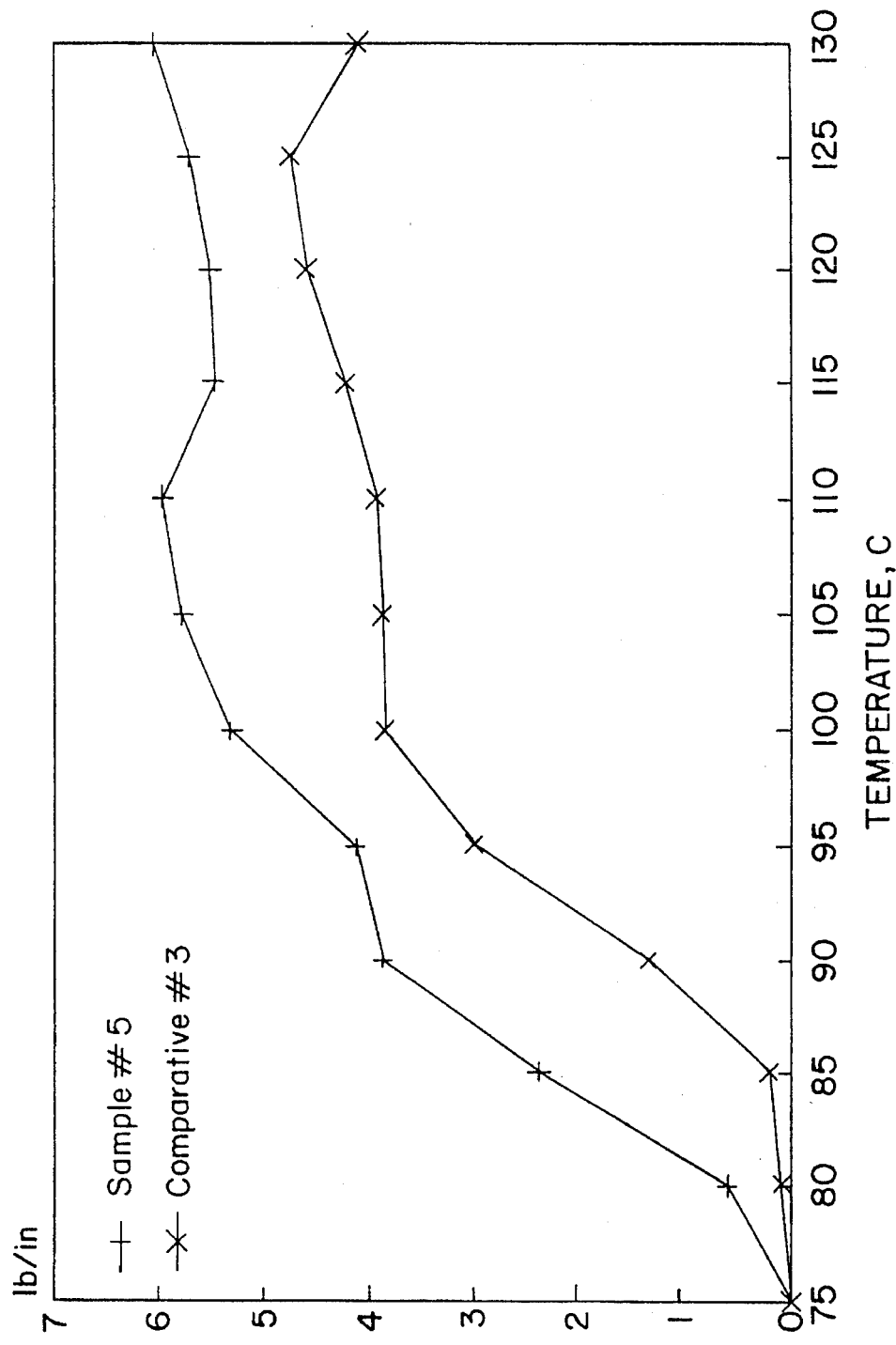
FIG. 12 is a graphical illustration of film heat seal strength versus temperature for resin 5 and comparative resin 3.

FIG. 12 is a graphical illustration of film heat seal strength versus temperature for resin 5 and comparative resin 3.

Figure 13:
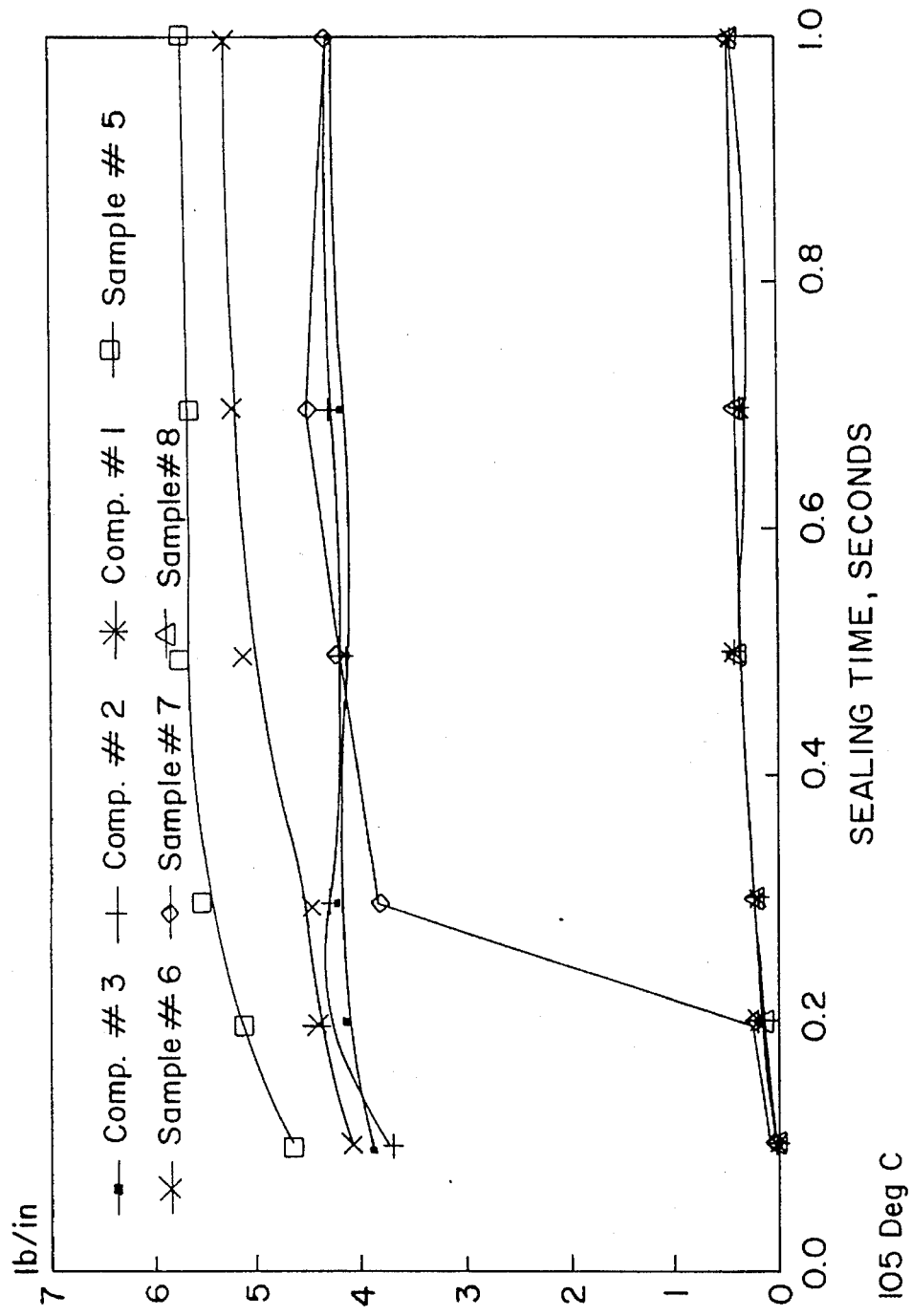
FIG. 13 is a graphical illustration of film heat seal strength versus sealing time for resins 5–7 and comparative resins 1–3 and comparative film 8.

FIG. 13 is a graphical illustration of film heat seal strength versus sealing time for resins 5–7 and comparative resins 1–3 and comparative film 8.

TABLE 5

| | Heat Seal Strength (lbs/inch) | | | | | | | |
|---|---|---|---|---|---|---|---|---|
| Temperature °C. (°F.) | Resin 1** | Resin 2** | Resin 3** | Resin 4 | Resin 5 | Resin 6 | Resin 7 | Resin 8** |
| 55 (131) | NA | NA | NA | 0 | NA | NA | NA | NA |
| 60 (140) | NA | NA | NA | 1.20 | NA | NA | NA | NA |
| 65 (149) | NA | NA | NA | 2.35 | NA | NA | NA | NA |
| 70 (158) | NA | NA | NA | 1.87 | NA | NA | NA | NA |
| 75 (167) | NA | NA | 0 | 1.68 | 0 | NA | NA | NA |
| 80 (176) | NA | 0.09 | 0.06 | 2.51 | 0.54 | NA | NA | NA |
| 85 (185) | NA | 0.21 | 0.14 | 2.67 | 2.38 | NA | NA | NA |
| 90 (194) | NA | 0.10 | 1.30 | 2.86 | 3.90 | 0 | NA | NA |
| 95 (203) | NA | 0.61 | 3.01 | 2.49 | 4.18 | 1.66 | NA | NA |
| 100 (212) | NA | 1.02 | 3.87 | 2.78 | 5.34 | 4.60 | 0 | 0 |
| 105 (221) | 0.04 | 4.05 | 3.90 | 3.02 | 5.80 | 5.03 | 2.98 | 0.20 |
| 110 (230) | 4.26 | 4.11 | 3.97 | 3.41 | 6.00 | 6.16 | 4.97 | 2.20 |
| 115 (239) | 4.95 | 4.34 | 4.27 | 3.61 | 5.50 | 6.06 | 5.86 | 5.10 |
| 120 (248) | 5.16 | 4.72 | 4.65 | 3.60 | 5.55 | 6.24 | 5.80 | 7.60 |
| 125 (257) | 6.48 | 5.00 | 4.80 | 3.78 | 5.76 | 5.50 | 6.43 | 8.80 |
| 130 (266) | 6.61 | 4.20 | 4.19 | 3.84 | 6.10 | 5.50 | 5.90 | 7.50 |

**Comparative Example Only
NA = Not Applicable

TABLE 6

Hot Tack* Strength (N/inch) v. Sealing Time (sec)

| Seal Time (sec) | Resin 1** Hot tack (N/in) | Resin 2** Hot tack (N/in) | Resin 3** Hot tack (N/in) | Resin 5 Hot tack (N/in) | Resin 6 Hot tack (N/in) | Resin 7 Hot tack (N/in) | Resin 8** tack (N/in) |
| --- | --- | --- | --- | --- | --- | --- | --- |
| 0.1 | 0 | 2.10 | 2.30 | 5.82 | 2.50 | 0.32 | 0 |
| 0.2 | 0.27 | 2.72 | 2.98 | 6.01 | 4.10 | 1.44 | 0.30 |
| 0.3 | 0.47 | 2.91 | 3.05 | 6.13 | 5.06 | 1.80 | 0.75 |
| 0.5 | 1.40 | 3.13 | 3.10 | 6.30 | 5.40 | 2.60 | 1.50 |
| 0.7 | 1.31 | 3.10 | 3.11 | 6.40 | 5.76 | 2.87 | 1.65 |
| 1.0 | 1.40 | 3.25 | 3.24 | 6.16 | 5.59 | 3.24 | 1.80 |

*Seal bar temperatures at 105° C.
**Comparative Example Only

The data in Table 6 show's that films made using the novel homogeneously branched substantially linear ethylene/α-olefin interpolymer have higher hot tack strength at low hot tack sealing times than film made from heterogeneously branched ethylene/α-olefin copolymers and commercially available SM3 film.

TABLE 7

Heat Seal* Strength (lbs/inch) v. Sealing time (sec)

| Seal Time (sec) | Resin 1** Heat seal (lbs/in) | Resin 2** Heat seal (lbs/in) | Resin 3** Heat seal (lbs/in) | Resin 5 Heat seal (lbs/in) | Resin 6 Heat seal (lbs/in) | Resin 7 Heat seal (lbs/in) | Resin 8** Heat seal (lbs/in) |
| --- | --- | --- | --- | --- | --- | --- | --- |
| 0.1 | 0 | 3.70 | 3.90 | 4.66 | 4.08 | 0.05 | 0 |
| 0.2 | 0.17 | 4.43 | 4.09 | 5.13 | 4.40 | 0.21 | 0.10 |
| 0.3 | 0.18 | 4.28 | 4.20 | 5.52 | 4.46 | 3.80 | 0.20 |
| 0.5 | 0.40 | 4.12 | 4.10 | 5.70 | 5.10 | 4.20 | 0.35 |
| 0.7 | 0.31 | 4.27 | 4.18 | 5.60 | 5.20 | 4.49 | 0.40 |
| 1.0 | 0.40 | 4.34 | 4.25 | 5.73 | 5.25 | 4.30 | 0.42 |

*Seal bar temperatures at 105° C.
**Comparative Example Only

The data in Table 7 shows that films made using the novel homogeneously branched substantially linear ethylene/α-olefin interpolymer have higher heat seal strength at low heat sealing times than film made from heterogeneously branched ethylene/α-olefin copolymers and commercially available SM3 film.

TABLE 8

Hayssen Heat Seal Strength of 2 L Water Filled Pouches lb$_f$/inch (N/m)

| Seal Temp °F. (°C.) | Resin 1* | Resin 2* | Resin 3* | Resin 5 | Resin 6 | Resin 7 |
| --- | --- | --- | --- | --- | --- | --- |
| 200 (93) | NA | NA | NA | 0 | NA | NA |
| 205 (96) | NA | NA | NA | 3.74 (656) | NA | NA |
| 210 (99) | NA | NA | 0 | 4.6 (806) | NA | NA |
| 215 (102) | NA | NA | 4.2 (736) | 5.21 (913) | 0 | NA |
| 220 (104) | NA | 0 | 4.25 (745) | 5.17 (906) | 5.54 (971) | NA |
| 225 (107) | NA | 4.65 (815) | 4.2 (736) | 4.94 (866) | 4.98 (961) | NA |
| 230 (110) | NA | 4.88 (855) | 4.3 (754) | 4.98 (873) | 5.48 (961) | NA |
| 235 (113) | NA | 4.75 (833) | 4.25 (745) | 5.25 (920) | 4.82 (845) | NA |
| 240 (116) | 0 | 4.86 (852) | 4.3 (754) | 5.42 (950) | 5.43 (952) | 0 |
| 245 (118) | 5.55 (973) | 4.95 (868) | 4.38 (768) | 5.55 (973) | 5.28 (926) | 5.55 (973) |
| 250 (121) | 5.65 (990) | 5.2 (912) | 4.07 (713) | 5.6 (982) | 4.99 (875) | 5.65 (983) |
| 255 (124) | 5.73 (1004) | 5.32 (932) | 4.32 (757) | 5.73 (1004) | 5.22 (915) | 5.73 (1004) |
| 260 (127) | 5.6 (982) | 5.4 (947) | 4.28 (750) | 5.69 (997) | 5.45 (955) | 5.6 (982) |
| 265 (129) | 5.8 (1017) | 5.11 (896) | 4.5 (789) | 5.72 (1003) | 5.15 (903) | 5.8 (1017) |
| 270 (132) | 5.59 (980) | 5.15 (903) | 4.45 (780) | 5.58 (978) | 5.02 (880) | 5.59 (980) |

*Comparative Example Only

The data in Table 8 shows that films made using the novel homogeneously branched substantially linear ethylene/α-olefin interpolymer have broader sealing ranges and higher Hayssen heat seal strengths than film made from heterogeneously branched ethylene/α-olefin copolymers having similar densities.

Figure 14:
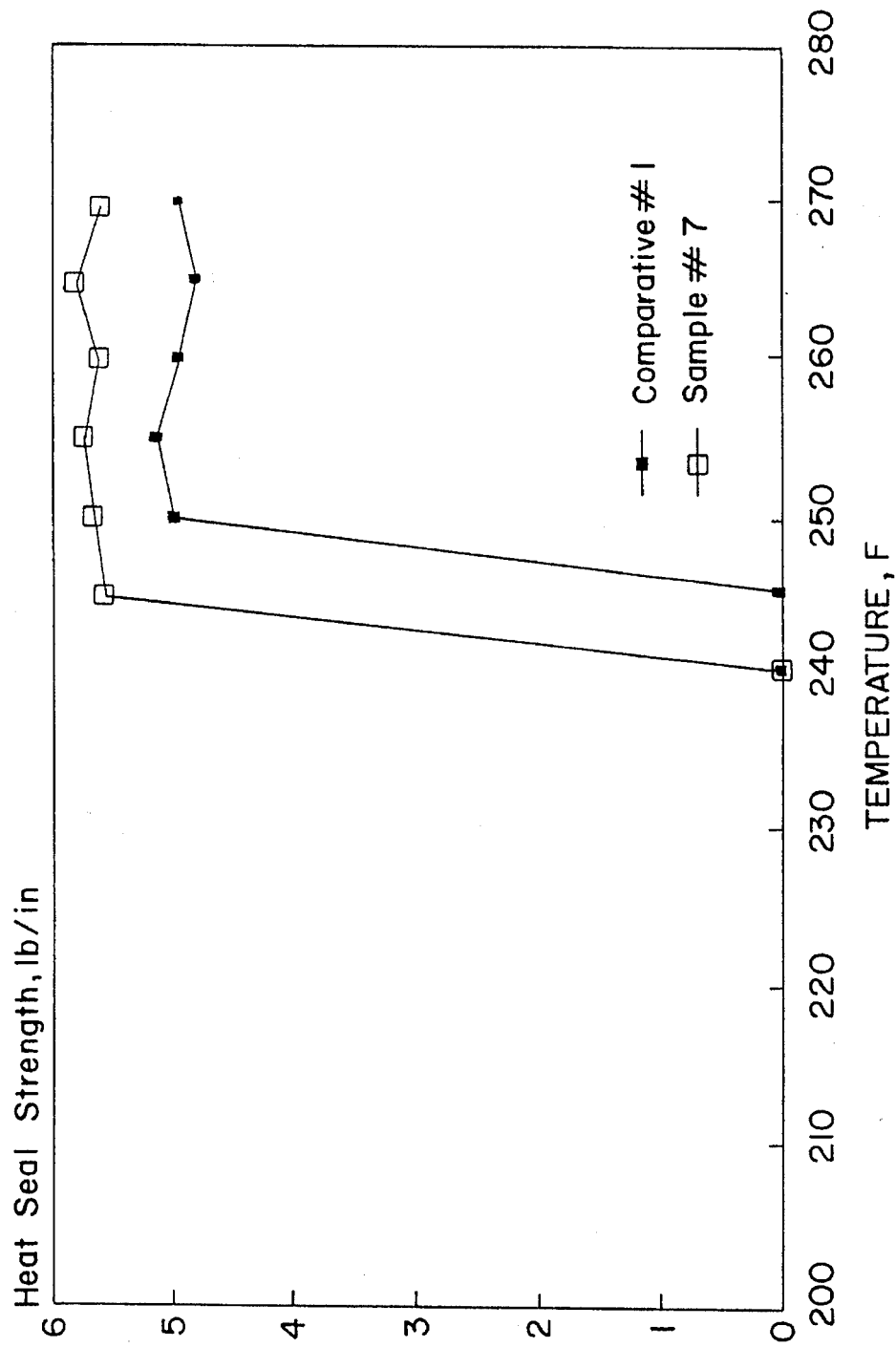
FIG. 14 is a graphical illustration of vertical form-fill-seal film heat seal strength versus temperature for resin 7 and comparative resin 1.

FIG. 14 is a graphical illustration of vertical form-fill-seal film heat seal strength versus temperature for resin 7 and comparative resin 1.

Figure 15:
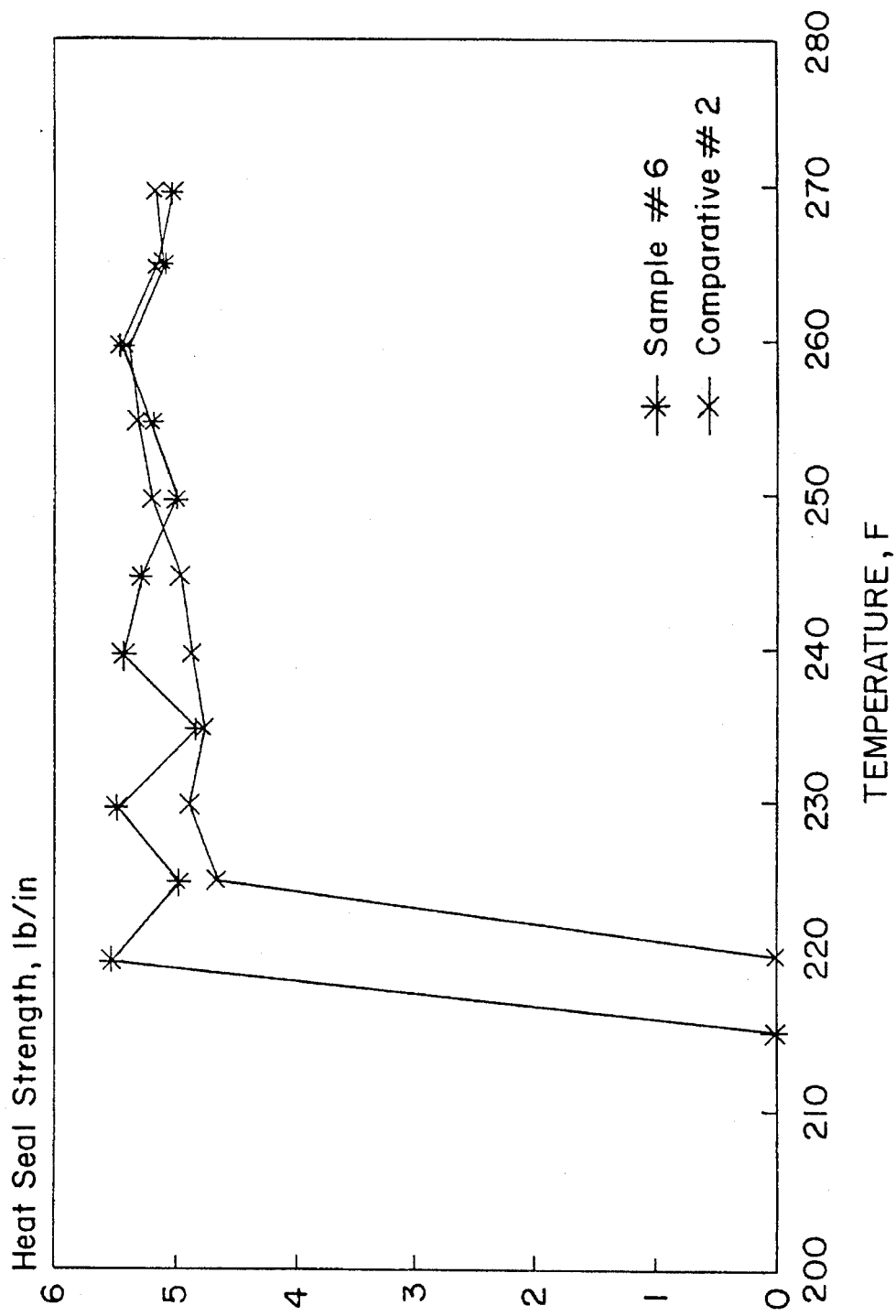
FIG. 15 is a graphical illustration of vertical form-fill-seal film heat seal strength versus temperature for resin 6 and comparative resin 2.

FIG. 15 is a graphical illustration of vertical form-fill-seal film heat seal strength versus temperature for resin 6 and comparative resin 2.

Figure 16:
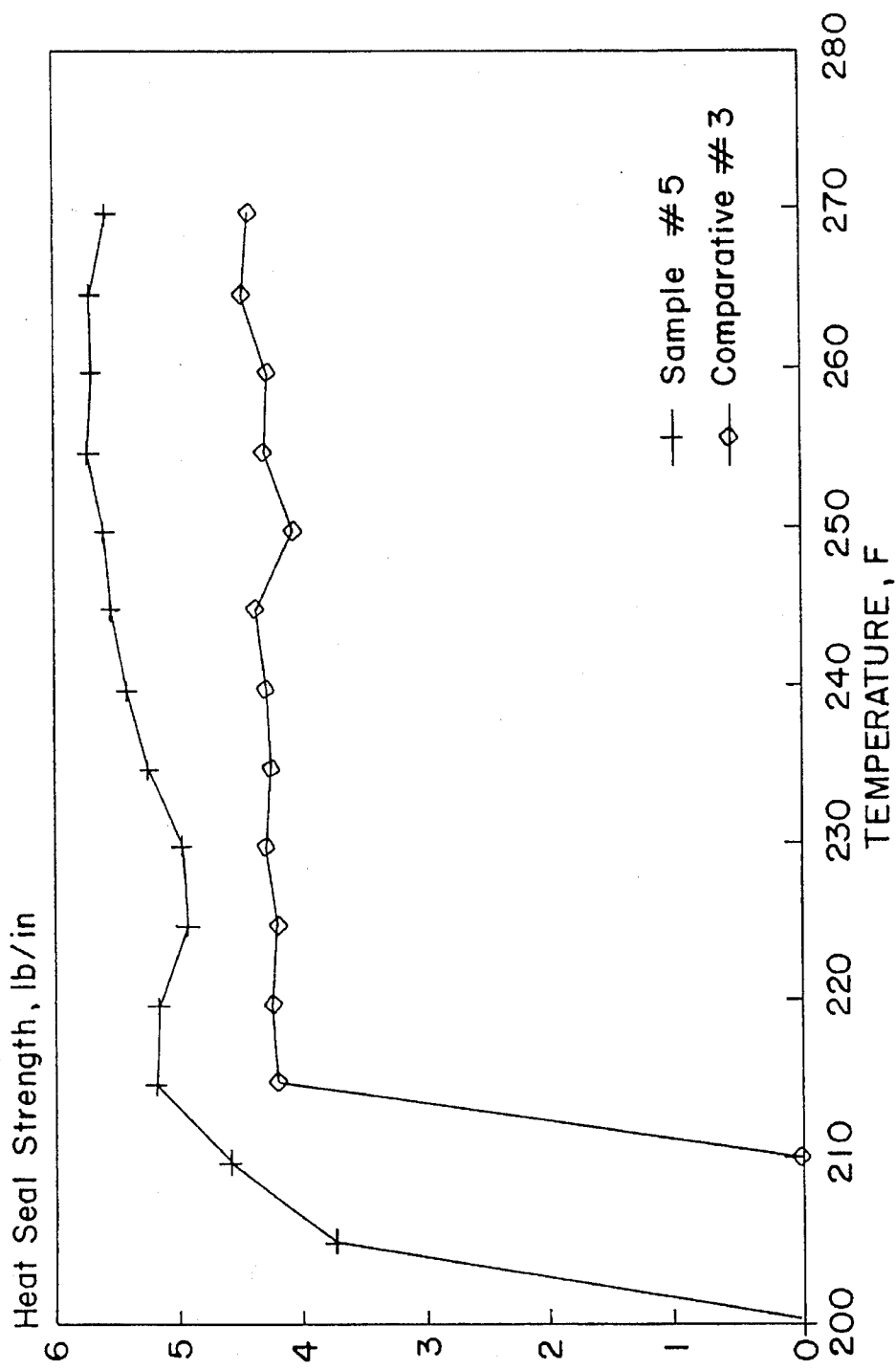
FIG. 16 is a graphical illustration of vertical form-fill-seal film heat seal strength versus temperature for resin 5 and comparative resin 3.

FIG. 16 is a graphical illustration of vertical form-fill-seal film heat seal strength versus temperature for resin 5 and comparative resin 3.

TABLE 9

Five Foot Drop Test

| Resin | No. of Failed Pouches | % Failure |
| --- | --- | --- |
| 1* | 100 | 100 |
| 2* | 8 | 8 |
| 3* | 3 | 3 |
| 5 | 0 | 0 |
| 6 | 1 | 1 |
| 7 | 38 | 38 |

*Comparative Example Only

Although resin 7 and comparative resin 1 have similar density, pouches made from resin 7 have a much lower percent failure than pouches made from comparative resin 1. Similarly, resin 6 and comparative resin 2 have similar density, but pouches made from resin 6 have a lower percent failure than pouches made from comparative resin 2. Pouches made using resin 5 also have lower percent failure than do pouches made using comparative resin 3, even though the resins have similar density.

We claim:

1. A process of preparing a pouch in a vertical form containing a flowable material comprising the steps of forming a film structure; forming the film structure into a tubular member; heat-sealing longitudinal edges and first transverse end of the tubular member to form the pouch; filling the pouch with the flowable material; and sealing a second transverse end of the tubular member, the film structure having at least one layer comprising:

(a) from 10 to 100 percent by weight of at least one homogeneously branched substantially linear ethylene/α-olefin interpolymer, and (b) from 0 to 90 percent by weight of at least one polymer selected from the group consisting of a heterogeneously branched linear ethylene/$C_3$–$C_{18}$ α-olefin copolymer, a high-pressure low density polyethylene and an ethylene/vinyl acetate copolymer.

2. A process of preparing a pouch in a vertical form containing a flowable material comprising the steps of forming a film structure; forming the film structure into a tubular member; heat-sealing longitudinal edges and first transverse end of the tubular member to form the pouch; filling the pouch with the flowable material; and sealing a second transverse end of the tubular member, the film structure having at least one layer comprising:

(I) (a) from 10 to 100 percent by weight of at least one homogeneously branched substantially linear ethylene/α-olefin interpolymer, and (b) from 0 to 90 percent by weight of at least one polymer selected from the group consisting of a heterogeneously branched linear ethylene/$C_3$–$C_{18}$ αolefin copolymer, a high-pressure low density polyethylene and an ethylene/vinyl acetate copolymer; and at least one layer comprising:

(II) a heterogeneously branched linear ethylene/$C_3$–$C_{18}$ α-olefin copolymer having a density greater that about 0.87 g/cm$^3$ and a melt index from about 0.1 to about 10 g/10 minutes.

3. The process of claim 2 wherein the film structure includes at least one other layer comprising:

(III) a high-pressure low density polyethylene having a density from about 0.916 to about 0.93 g/cm$^3$ and a melt index from about 0.1 to about 10 g/10 minutes.

4. The process of claims 1 or 2 wherein said homogeneously branched substantially linear ethylene/α-olefin interpolymer is a copolymer of ethylene and a $C_3$–$C_{20}$ α-olefin.

5. The process of claims 1 or 2 wherein said homogeneously branched substantially linear ethylene/α-olefin interpolymer is an ethylene/1-octene copolymer.

6. The process of claims 1 or 2 wherein said homogeneously branched substantially linear ethylene/α-olefin interpolymer is an ethylene/1-hexene copolymer.

7. The process of claims 1 or 2 wherein said homogeneously branched substantially linear ethylene/α-olefin interpolymer is an ethylene/1-butene copolymer.

8. The process of claims 1 or 2 wherein said homogeneously branched substantially linear ethylene/α-olefin interpolymer is an ethylene/propene copolymer.

9. The process of claims 1 or 2 wherein said homogeneously branched substantially linear ethylene/α-olefin interpolymer has a density from about 0.85 g/cm$^3$ to about 0.94 g/cm$^3$.

10. The process of claims 1 or 2 wherein said homogeneously branched substantially linear ethylene/α-olefin interpolymer has a melt index from about 0.01 g/10 minutes to about 10 g/10 minutes.

11. The process of claims 1 or 2 wherein said homogeneously branched substantially linear ethylene/α-olefin interpolymer has a $I_{10}/I_2$ ratio from about 7 to about 20.

12. The process of claims 1 or 2 wherein said homogeneously branched Substantially linear ethylene/α-olefin interpolymer has a $M_w/M_n$ from about 1.5 to about 2.5.

13. The process of claims 1 or 2 wherein said homogeneously branched substantially linear ethylene/α-olefin interpolymer has a $M_w/M_n$ of about 2.

14. The process of claims 1 or 2 wherein said film structure has a heat sealing range from about 50° C. to about 160° C.

15. The process of claims 1 or 2 wherein said film structure has a heat sealing range from about 75° C. to about 130° C.

16. The process of claims 1 or 2 wherein said homogeneously branched substantially linear ethylene/α-olefin interpolymer has a melting point range from about 50° C. to about 130° C.

17. The process of claims 1 or 2 wherein said homogeneously branched substantially linear ethylene/α-olefin interpolymer has a melting point range from about 55° C. to about 110° C.

* * * * *